US012153605B2

(12) United States Patent
Pratik et al.

(10) Patent No.: US 12,153,605 B2
(45) Date of Patent: Nov. 26, 2024

(54) SYNTHETIC DATA GENERATION

(71) Applicant: Wells Fargo Bank, N.A., San Francisco, CA (US)

(72) Inventors: Aadarsh Pratik, Maharashtra (IN); Mrugesh S. Kulkarni, New Jersey, NJ (US); Tarun Bhatnagar, Edison, NJ (US); Shrikant Khaire, Charlotte, NC (US); Ramachandhran Subrahmanian, East Windsor, NJ (US); Indira Korrapati, Waxhaw, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/311,714

(22) Filed: May 3, 2023

(65) Prior Publication Data

US 2023/0409607 A1    Dec. 21, 2023

Related U.S. Application Data

(63) Continuation of application No. 17/354,285, filed on Jun. 22, 2021, now Pat. No. 11,675,817.

(51) Int. Cl.
*G06F 7/00* (2006.01)
*G06F 16/28* (2019.01)
*G06F 21/62* (2013.01)
*G06N 20/00* (2019.01)

(52) U.S. Cl.
CPC ........ *G06F 16/285* (2019.01); *G06F 21/6245* (2013.01); *G06N 20/00* (2019.01)

(58) Field of Classification Search
CPC .... G06F 16/285; G06F 21/6245; G06N 20/00

USPC .................................................. 707/600–899
See application file for complete search history.

(56) References Cited

U.S. PATENT DOCUMENTS

| | | |
|---|---|---|
| 8,862,557 B2 | 10/2014 | Glasser et al. |
| 9,870,310 B1 | 1/2018 | Arguelles et al. |
| 10,339,038 B1 | 7/2019 | Singh et al. |
| 10,559,957 B2 | 3/2020 | Walters et al. |
| 10,599,957 B2 | 3/2020 | Walters et al. |
| 2010/0192220 A1 | 7/2010 | Heizmann et al. |
| 2015/0127575 A1 | 5/2015 | Heizmann et al. |

(Continued)

OTHER PUBLICATIONS

Mockaroo—Random Data Generator and API Mocking Tool [retrieved from Internet] https://www.mockaroo.com/.
Datprof [retrieved from Internet] https://www.datprof.com/.

*Primary Examiner* — Isaac M Woo
(74) *Attorney, Agent, or Firm* — K&L Gates LLP

(57) ABSTRACT

Methods, apparatuses, and computer program products are disclosed for synthetic data generation and dynamic processing model selection. An example method includes receiving a request for synthetic data generation where the request for synthetic data generation includes one or more configuration data parameters. The method further includes selecting at least one processing model from amongst a plurality of processing models based upon the one or more configuration data parameters. The method also includes generating one or more synthetic datasets that include one or more synthetic data values via the selected at least one processing model. The method further includes providing, to a user via a user interface, the one or more generated synthetic datasets.

20 Claims, 13 Drawing Sheets

(56) References Cited

U.S. PATENT DOCUMENTS

2020/0012662 A1 1/2020 Walters
2020/0193223 A1* 6/2020 Hazard ............... G06V 10/764
2020/0320371 A1 10/2020 Baker

* cited by examiner

600

```
┌─────────────────────────────────────────────────┐
│ Determine one or more data categories, one or   │
│ more values for the one or more data categories,│
│ and a requested number of requested data        │
│ generations based at least in part on the one   │
│ or more configuration data parameters           │
│                    601                          │
└─────────────────────────────────────────────────┘
                        │
                        ▼
┌─────────────────────────────────────────────────┐
│ Generate one or more data values for the one or │
│ more data categories based on the provided the  │
│ one or more values for the one or more data     │
│ categories and the requested number of requested│
│ data generations from the one or more           │
│ configuration parameters                        │
│                    602                          │
└─────────────────────────────────────────────────┘
```

Determine whether the one or more configuration parameters are indicative of one or more dependency algorithms
701

Generate one or more data values associated with the one or more dependency algorithms based at least in part on the relationship described by the one or more dependency algorithms
702

800

Generate one or more synthetic datasets comprising one or more generated synthetic data values via one or more machine learning models
801

Determine whether the one or more generated synthetic datasets satisfy an indication value
802

In an instance in which the one or more generated synthetic datasets fail to satisfy an indication value threshold, modify one or more generated synthetic data values by one or more modification values
803

Modify one or more base data values containing personally identifiable information data by one or more modification values such that one or more modified base data values are generated via a noise generation model
901

---

Replace the one or more base data values containing personally identifiable information data values with the one or more modified base data values via the noise generation model
902

---

Modify the one or more data values other than the one or more base data values containing personally identifiable information data values defined by the one or more base datasets by one or more modification values via the noise generation model
903

Obfuscate the one or more base data values containing personally identifiable information data values from the one or more base datasets via an obfuscation generation model
1001

Modify the one or more data values other than the one or more base data values containing personally identifiable information data values defined by the one or more base datasets by one or more modification values via the obfuscation generation model
1002

Select a first processing model for processing a first set of configuration data parameters from amongst the one or more received configuration data parameters
1101

Select a second processing model for processing a second set of configuration data parameters from amongst the one or more received configuration data parameters
1102

Generate one or more first synthetic datasets for the first set of configuration data parameters via the first selected processing model and generate one or more second synthetic datasets for the second set of configuration data parameters via the second selected processing model
1103

| Attribute_Name | Data_Type | Size | Logic | Dependent_Upon | Variable_Values | Dependent_Values | Bucket_Probabilities | Lower_Bound | Upper_Bound |
|---|---|---|---|---|---|---|---|---|---|
| gender | CHAR | 1 | Simple_Bucket | | ['M','F'] | | [0.6,0.4] | | |
| name | CHAR | 50 | Name | gender | | | | | |
| email | CHAR | 100 | Email | name | | | | | |
| age | Number | 3 | Normal | | | | | | |
| generation | CHAR | 100 | Dependent | age | ['Pre-Boomer','Baby Boomers','Generation X','Generation Y','Generation Z'] | ['74-120','54-74','40-54','24-40','0-24'] | | | |
| income | Number | 25 | Bucket_with_bounds | | ['0-24999','25000-49999','50000-99999','100000-249999','250000-500000'] | | [0.15,0.25,0.3,0.2,0.1] | | |
| income_slab | CHAR | 100 | Dependent | income | ['Under 25K','25K-50K','50K-100K','100K-250K','250K-500K'] | ['0-24999','25000-49999','50000-99999','100000-249999','250000-500000'] | | | |
| state | CHAR | 2 | State | | | | | | |
| zip | CHAR | 5 | Zip | state | | | | | |

| gender | name | email | age | generation | income | income_slab | state | zip |
|---|---|---|---|---|---|---|---|---|
| F | Kaitlyn Allen | KaitlynAllen7105@hotmail.com | 70 | Baby Boomers | 51901 | 50K-100K | IA | 50593 |
| F | Ashley Vang | AshleyVang6336@gmail.com | 66 | Baby Boomers | 406568 | 250K-500K | IN | 46392 |
| M | Arthur Ingram | ArthurIngram8914@hotmail.com | 40 | Generation X | 26825 | 25K-50K | IL | 61650 |
| M | Darrell Peterson | DarrellPeterson6403@msn.com | 51 | Generation X | 146203 | 100K-250K | TX | 75844 |
| M | Robert Watson | RobertWatson8212@yahoo.com | 68 | Baby Boomers | 85699 | 50K-100K | WV | 25286 |
| M | Vincent Parker | VincentParker5675@gmail.com | 103 | Pre-Boomer | 81351 | 50K-100K | TX | 78589 |
| F | Crystal Brown | CrystalBrown8151@msn.com | 48 | Generation X | 37224 | 25K-50K | NY | 12074 |
| M | Richard Johnson | RichardJohnson5850@msn.com | 58 | Baby Boomers | 96789 | 50K-100K | TX | 76252 |
| M | Kevin Adams | KevinAdams3807@yahoo.com | 49 | Generation X | 96120 | 50K-100K | UT | 84171 |
| F | Ashley Dorsey | AshleyDorsey1512@hotmail.com | 49 | Generation X | 74814 | 50K-100K | PA | 16351 |
| M | James Bryant | JamesBryant9341@hotmail.com | 82 | Pre-Boomer | 38396 | 25K-50K | MS | 39565 |
| F | Melinda Simpson | MelindaSimpson4027@msn.com | 21 | Generation Z | 53304 | 50K-100K | WI | 54128 |
| F | Jacqueline Garcia | JacquelineGarcia4763@hotmail.com | 28 | Generation Y | 135170 | 100K-250K | IL | 62866 |
| M | Laurent Case | LaurentCase6867@hotmail.com | 79 | Pre-Boomer | 36328 | 25K-50K | AZ | 85710 |
| M | Philip Williams | PhilipWilliams9208@hotmail.com | 38 | Generation Y | 337997 | 250K-500K | NV | 89314 |

SYNTHETIC DATA GENERATION

CROSS-REFERENCE TO RELATED APPLICATIONS

This application is a continuation of U.S. patent application Ser. No. 17/354,285, filed Jun. 22, 2021, the entire contents of which are incorporated herein by reference.

TECHNOLOGICAL FIELD

Example embodiments of the present disclosure relate to dynamic processing model selection and associated synthetic data generation.

BACKGROUND

Testing data may be leveraged or otherwise useful to a variety of processing systems, such as for algorithmic investigations, model prototyping, and/or integration testing of technical components. For example, these datasets may assist with the testing and/or training of various processing systems so as to improve upon the functionality or outputs of these systems. Testing data and associated data processing systems may also be applicable to a wide range of industries, such as healthcare, finance, manufacturing, and/or the like.

BRIEF SUMMARY

Some datasets may include data values derived from real-world events, individuals, entities, or the like (e.g., real data). Due to the basis in or dependency upon real-world events, real datasets may contain personally identifiable information (PII) or data that is personal, private, and/or confidential and, as such, may require removal and/or concealment before use. By way of example, real datasets may contain an individual's social security number, patient identification number, taxpayer identification number, financial account number, and/or the like. Additionally, access to datasets that include real data values are often limited in conventional systems not only to ensure the privacy of underlying users but also due to the time-consuming nature of managing real datasets. Furthermore, the availability of real data for many applications may be limited due to the limited quantity of applicable users (e.g., niche testing applications or processes).

As such, synthetic datasets may be used as an alternative to real datasets. Synthetic datasets may include artificially manufactured data created by one or more algorithms and, as such, may reduce or remove the concerns related to PII or confidential user data. Traditional systems that attempt to provide synthetic data generation, however, are often limited in their output capabilities. For example, conventional synthetic data generation systems may rigidly apply a single model or method for generating synthetic datasets. In doing so, these systems fail to address the dynamic nature of user requests for data that accurately represents underlying users and/or require the use of various disparate systems that fail to provide a comprehensive or integrated approach to synthetic data generation.

To solve these issues and others, example implementations of embodiments of the present disclosure may utilize a synthetic data generation system that provides for the dynamic selection of processing models. In operation, configuration data parameters associated with a user request may be analyzed to select an appropriate processing model from amongst a plurality of processing models, and the selected model(s) may subsequently generate one or more synthetic datasets that accurately address the initial user request. In doing so, the systems described herein may rapidly adapt to dynamic user requests. For example, in some embodiments, the system may identify sets of configuration data parameters that may be associated with distinct processing models. As such, these distinct processing models (e.g., a first and a second processing model) may be used to employ a parallel processing regime in which respective sets of synthetic data are generated substantially simultaneously. In this way, the plurality of processing models may be leveraged such that the computational complexity of the runtime operations is reduced, thus resulting in a more time efficient and less computationally resource-intensive method for synthetic data generation.

Systems, apparatuses, methods, and computer program products are disclosed herein for synthetic data generation. With reference to an example method, the method may include receiving a request for synthetic data generation that includes one or more configuration data parameters and selecting at least one processing model from amongst a plurality of processing models based upon the one or more configuration data parameters. The method may further include generating one or more synthetic datasets that include one or more synthetic data values via the selected at least one processing model and providing, to a user via a user interface, the one or more generated synthetic datasets.

In some embodiments, selecting the at least one processing model from amongst the plurality of processing models may further include selecting a first processing model for processing a first set of configuration data parameters from amongst the one or more received configuration data parameters and selecting a second processing model for processing a second set of configuration data parameters from amongst the one or more received configuration data parameters. In such an embodiment, generating the one or more synthetic datasets may further include generating one or more first synthetic datasets for the first set of configuration data parameters via the first selected processing model and generating one or more second synthetic datasets for the second set of configuration data parameters via the second selected processing model.

In some further embodiments, generating the one or more first synthetic datasets and the one or more second synthetic datasets may occur substantially simultaneously.

In some embodiments, selecting the at least one processing model from amongst the plurality of processing models may further include determining whether the one or more configuration data parameters are indicative of one or more base datasets. In an instance in which the one or more configuration data parameters fail to identify one or more base datasets, the method may include selecting one or more rules-based generation models. In such an embodiment, generating the one or more synthetic datasets may further include determining, via the one or more rules-based generation models, one or more data categories, one or more values for the one or more data categories, and a requested number of requested data generations based at least in part on the one or more configuration data parameters. The method may further include generating one or more data values for the one or more data categories based on the provided one or more values for the one or more data categories and the requested number of requested data generations.

In some further embodiments, generating the one or more synthetic datasets may further include determining, via the one or more rules-based generation models, whether the one or more configuration parameters are indicative of one or more dependency algorithms, wherein the one or more dependency algorithms are indicative of a relationship between two or more data values from the one or more data categories. In such an embodiment, the method may further include generating, via the one or more rules-based generation models, one or more data values associated with the one or more dependency algorithms based at least in part on the relationship defined by the one or more dependency algorithms.

In an instance in which the one or more configuration data parameters are associated with one or more base datasets, the method may include selecting one or more machine learning generation models. In such an embodiment, generating the one or more synthetic datasets may further include generating a generated synthetic dataset that includes one or more generated synthetic data values via one or more machine learning generation models and determining, via the one or more machine learning generation models, whether the generated synthetic dataset including the one or more generated synthetic data values satisfies an indication value. In an instance in which the generated synthetic data fails to satisfy an indication value threshold, the method may include modifying the one or more generated synthetic data values by one or more modification values via the one or more machine learning generation models.

In an instance in which the one or more configuration data parameters are indicative of one or more base datasets and the one or more configuration data parameters are indicative of required removal of one or more base data values containing personally identifiable information data values from the one or more base datasets, the method may include selecting one or more noise generation models for processing of the one or more configuration data parameters. In such an embodiment, generating the one or more synthetic datasets may further include modifying the one or more base data values containing personally identifiable information data value by one or more modification values such that one or more modified base data values are generated via the one or more noise generation models and replacing the one or more base data values describing personally identifiable information data values with the one or more modified base data values via the one or more noise generation models.

In some embodiments, selecting the at least one processing model from amongst the plurality of processing model further includes, in an instance in which the one or more configuration data parameters are indicative of one or more base datasets and the one or more configuration data parameters fail to indicate required removal of one or more base data values describing personally identifiable information data values from the one or more base datasets, selecting one or more obfuscation generation models for processing of the one or more configuration data parameters. In such an embodiment, generating the one or more synthetic datasets further includes obfuscating, via the one or more obfuscation generation models, the one or more base data values describing personally identifiable information data values from the one or more base datasets.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 6 illustrates an example flowchart for generating one or more synthetic datasets via one or more rules-based generation models in accordance with some example embodiments described herein.

FIG. 8 illustrates an example flowchart for generating one or more synthetic datasets via one or more machine learning generation models in accordance with some example embodiments described herein.

FIG. 9 illustrates an example flowchart for generating one or more synthetic datasets via one or more noise generation models in accordance with some example embodiments described herein.

FIG. 10 illustrates an example flowchart for generating one or more synthetic datasets via one or more obfuscation generation models in accordance with some example embodiments described herein.

FIG. 11 illustrates an example flowchart for generating one or more synthetic datasets for a first set and second set of configuration data parameters in accordance with some example embodiments described herein.

FIG. 12 illustrates an operational example of one or more configuration data parameters in accordance with some example embodiments described herein.

FIG. 13 illustrates an operational example of a generated dataset in accordance with some example embodiments described herein.

DETAILED DESCRIPTION

Figure 1:
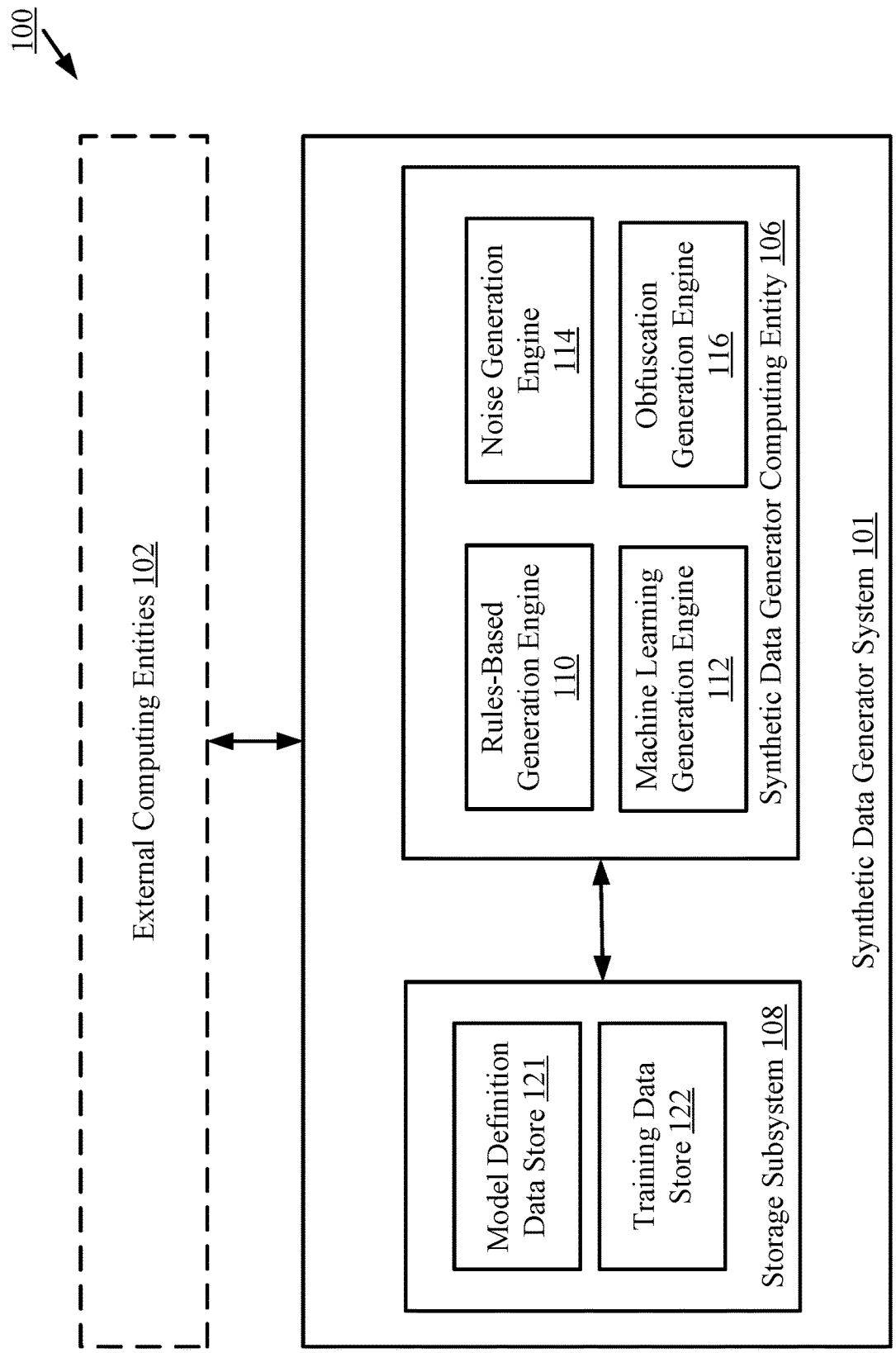
FIG. 1 illustrates an exemplary overview of a system that may be used to practice embodiments of the present disclosure.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to synthetic data generator system or computing entity as an example "apparatus." However, elements of the apparatus described herein may be equally applicable to the claimed method and computer program product. Thus, use of any such terms should not be taken to limit the spirit and scope of embodiments of the present disclosure.

DEFINITION OF TERMS

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the terms "configuration data parameter" may refer to a specification pertaining to the request for one or more synthetic datasets. In some embodiments, a configuration data parameter may, at least in part, set one or more conditions for the generation of one or more synthetic datasets. For example, a configuration data parameter may specify whether one or more base datasets are available, the location of one or more base datasets if available, whether the one or more base datasets comprise PII, an indication of which data categories and/or data values in the one or more base datasets contain PII, an indication whether to remove one or more base data values containing PII, one or more dependency algorithms for one or more data values, one or more data categories, one or more values for the one or more data categories, a requested number of requested data generations, and/or the like. In some embodiments, a configuration data parameter may be specified by a user, such as by utilizing a user interface. In some embodiments, a configuration data parameter may be determined by a computing entity. In some embodiments, a computing entity may prompt a user for a configuration data parameter input.

As used herein, the terms "base dataset" may refer to a dataset comprising one or more data categories and one or more data values for the one or more data categories. In some embodiments, a base dataset may be associated with a set of one or more configuration data parameters, such as the one or more configuration data parameters that are used to generate the base dataset or one or more configuration data parameters received with the attached and/or referenced base dataset. In some embodiments, the base dataset may be a real dataset based on real-world events, users, entities, etc. In some embodiments, the base dataset may be attached with a request for synthetic data generation. In some embodiments, the location of the base dataset may be indicated by one or more associated configuration data parameters. The base dataset may also be stored in an associated memory. Alternatively, the base dataset may not be stored in memory or may only be stored for a temporary duration. In such an embodiment, any PII data contained within the base dataset may be periodically removed from storage, thus decreasing the risk of exposure of PII data. In some embodiments, the base dataset and/or one or more base dataset values may be encrypted and stored in an associated memory and may only be decrypted with appropriate access credentials. In this way, the base dataset may be stored and accessed while protecting any contained PII data.

The terms "rules-based generation model" may refer to an electronically-stored data construct that is configured to describe parameters, hyper-parameters, and/or stored operations of a model that is configured to process one or more configuration data parameters in order to generate one or more synthetic datasets. In some embodiments, the rules-based generation model is configured with one or more rules specified by one or more mathematical models and/or algorithms. In some embodiments, the one or more algorithms may support generating various data value distributions including uniform distributions, normal distributions, Poisson distributions, binomial distributions, t-distributions, chi-squared distributions, and/or the like.

The terms "machine learning generation model" may refer to an electronically-stored data construct that is configured to describe parameters, hyper-parameters, and/or stored operations of a machine learning generation model that is configured to process one or more base datasets and/or one or more configuration data parameters in order to generate one or more synthetic datasets. In some embodiments, the machine learning generation model is a machine learning generation model comprising a generative adversarial network (GAN) framework. In some embodiments, the machine learning generation model may employ one or more neural style transfer (NST) techniques and/or tabular variational auto encoder (TVAE) techniques. In some embodiments, the one or more machine learning generation models may be machine learning generation models trained at least in part using one or more base datasets. In some embodiments, the one or more machine learning generation models may be trained to determine or to otherwise derive an optimal configuration and/or to optimize one or more associated hyperparameters. By way of a nonlimiting example, a number of nodes in a neural network, a number of generator training runs for each associated training run of a discriminator, a loss and optimizer function, one or more early stopping criteria, quality metrics, and/or the like may be configured based upon iterative operation of the one or more machine learning generation models. In some embodiments, the parameters and/or hyper-parameters of a machine learning generation model may be represented as values in an n by n dimensional array, such as a matrix. In some embodiments, the number of parameters and/or hyperparameters may be determined based at least in part on the size of the one or more base datasets and/or one or more configuration data parameters. The present disclosure contemplates that the machine learning generation model may encompass any machine learning, artificial intelligence, or neural network structure and may similarly perform and machine learning technique.

The terms "noise generation model" may refer to an electronically-stored data construct that is configured to describe parameters, hyper-parameters, and/or stored operations of a model that is configured to process one or more base datasets and/or one or more configuration data parameters in order to generate one or more synthetic datasets. In some embodiments, the noise generation model is configured with one or more rules specified by one or more mathematical models and/or algorithms. In some embodiments, the noise generation model may be configured to remove one or more data values indicated as PII data values. In some embodiments, the one or more algorithms may support generating various data value distributions including uniform distributions, normal distributions, Poisson distributions, binomial distributions, t-distributions, chi-squared distributions, and the like.

The term "obfuscation generation model" may refer to an electronically-stored data construct that is configured to describe parameters, hyper-parameters, and/or stored operations of a model that is configured to process one or more base datasets and/or one or more configuration data parameters in order to generate one or more synthetic datasets. In some embodiments, the obfuscation generation model is configured with one or more rules specified by one or more mathematical models and/or algorithms. In some embodiments, the obfuscation generation model may be configured to mask or otherwise conceal one or more data values indicated as PII data values. In some embodiments, the one or more algorithms may support various generating various data value distributions including uniform distributions, normal distributions, Poisson distributions, binomial distributions, t-distributions, chi-squared distributions, and the like.

Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Framework

FIG. 1 is a schematic diagram of an example system architecture 100 for performing synthetic data generation operations. The system architecture 100 includes a synthetic data generator system 101 including a synthetic data generator computing entity 106 configured to select one or more processing models from amongst a plurality of processing models and use the one or more selected processing models to generate one or more synthetic datasets. The synthetic data generator system 101 may, in some embodiments, communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 includes a storage subsystem 108 configured to store at least a portion of the data utilized by the synthetic data generator system 101. The synthetic data generator computing entity 106 may also be in communication with one or more external computing entities 102. In some embodiments, the synthetic data generator computing entity 106 may be configured to train one or more processing models based at least in part on the training data store 122 stored in the storage subsystem 108 and store the one or more trained processing models as part of the model definition data store 121 stored in the storage subsystem 108. The storage subsystem 108 may be configured to store the model definition data store 121 used to store the definition of one or more processing models and the training data store 122 used to train one or more processing models. The external computing entity 102 (e.g., a management computing entity or the like) may periodically update/provide raw input data (e.g., real and/or synthetic generated datasets) to the synthetic data generator system 101 to serve as training data, which may be stored in the training data store 122 and/or storage subsystem 108. The synthetic data generator computing entity 106 may be configured to receive requests and/or data from external computing entities 102, process the requests and/or data to generate one or more synthetic datasets, and/or provide the one or more synthetic datasets to the external computing entities 102. The external computing entities 102 may additionally or alternatively generate user interface data (e.g., one or more data objects) corresponding to one or more generated synthetic datasets and may provide (e.g., transmit, send and/or the like) the user interface data corresponding with the one or more generated synthetic datasets for presentation to user computing entities operated by end-users. Although illustrated in FIG. 1 as separate components, the present disclosure contemplates that, in some embodiments, the synthetic data generator system 101 and/or the synthetic data generator computing entity 106 may comprise the external computing entities 102.

The storage subsystem 108 may be configured to store at least a portion of the data utilized by the synthetic data generator computing entity 106 to perform synthetic data generation steps/operations and tasks. The storage subsystem 108 may be configured to store at least a portion of operational data and/or operational configuration data including operational instructions and parameters utilized by the synthetic data generator computing entity 106 to perform steps/operations in response to requests for synthetic data. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The synthetic data generator computing entity 106 includes a rules-based generation engine 110, a machine learning generation engine 112, a noise generation engine 114, and an obfuscation generation engine 116. The rules-based generation engine 110 may be configured with circuitry and/or computer program code to execute and/or operate one or more rules-based processing models to generate one or more synthetic datasets based on one or more received configuration data parameters as defined above. The machine learning generation engine 112 may be configured with circuitry and/or computer program code to execute and/or operate one or more machine learning generation models to generate one or more synthetic datasets based on one or more received configuration data parameters as defined above. The noise generation engine 114 may be configured with circuitry and/or computer program code to execute and/or operate one or more noise-based models to generate one or more synthetic datasets based on one or more received configuration data parameters as defined above. The obfuscation generation engine 116 may be configured with circuitry and/or computer program code to execute and/or operate one or more obfuscation generation models to generate one or more synthetic datasets based on one or more received configuration data parameters as defined above.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the synthetic data generator computing entity 106 may provide or supplement the functionality of particular circuitry. The one or more rules-based generation models, machine learning generation models, noise generation models, and obfuscation generation models may be stored in the storage subsystem 108 and/or in the model definition data store 121 or may be otherwise accessible by respective engines 110, 112, 114, and 116.

Exemplary Synthetic Data Generator Computing Entity

Figure 2:
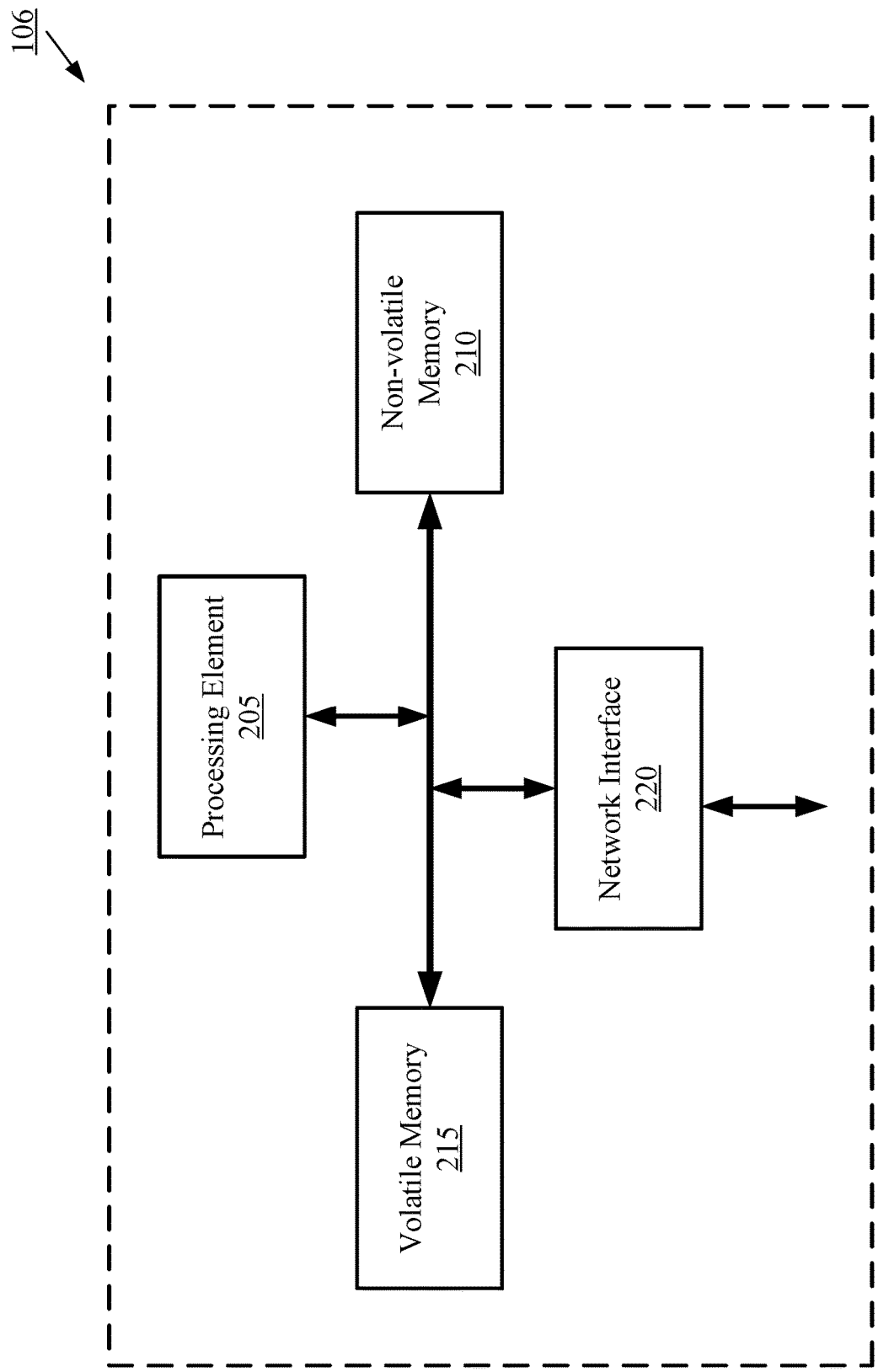
FIG. 2 illustrates an example synthetic data generator computing entity in accordance with some embodiments discussed herein.

FIG. 2 provides an example schematic of a synthetic data generator computing entity 106 according to one embodiment of the present disclosure. In general, the terms computing entity, computer, entity, device, system, controller, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes may be performed on data, content, information, and/or similar terms used herein interchangeably.

As indicated, in one embodiment, the synthetic data generator computing entity 106 may also include a network interface 220 for communicating with various computing entities, such as by communicating data, content, information, and/or similar terms used herein interchangeably that may be transmitted, received, operated on, processed, displayed, stored, and/or the like. In some embodiments, the network interface may be configured to access a network via Bluetooth, NFC, Wi-Fi, 3G, 4G, 5G, RFID protocols, and the like. By way of a particular example, the networking interface 220 may configured to communicate with the synthetic data generator system 101 or computing entity or other computing device via a network.

As shown in FIG. 2, in one embodiment, the synthetic data generator computing entity 106 may include or be in communication with a processing element 205 (also referred to as processors, processing circuitry, and/or similar terms used herein interchangeably) that communicate with other elements within the synthetic data generator computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media 215, 210 or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the synthetic data generator computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the synthetic data generator computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the synthetic data generator computing entity 106 with the assistance of the processing element 205 and operating system.

As indicated, in one embodiment, the synthetic data generator computing entity 106 may also include a network interface 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the synthetic data generator computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, 4G, 5G, and/or any other wireless protocol.

Although not shown, the synthetic data generator computing entity 106 may include or be in communication with one or more input elements, such as a keyboard input, a mouse input, a touch screen/display input, motion input, movement input, audio input, pointing device input, joystick input, keypad input, and/or the like. The synthetic data generator computing entity 106 may also include or be in communication with one or more output elements (not shown), such as audio output, video output, screen/display output, motion output, movement output, and/or the like. By way of example, the synthetic data generator computing entity 106 may be, via the network interface 220, be configured to cause generation/presentation of a user interface displaying synthetic datasets as described hereafter.

Exemplary External Computing Entity

Figure 3:
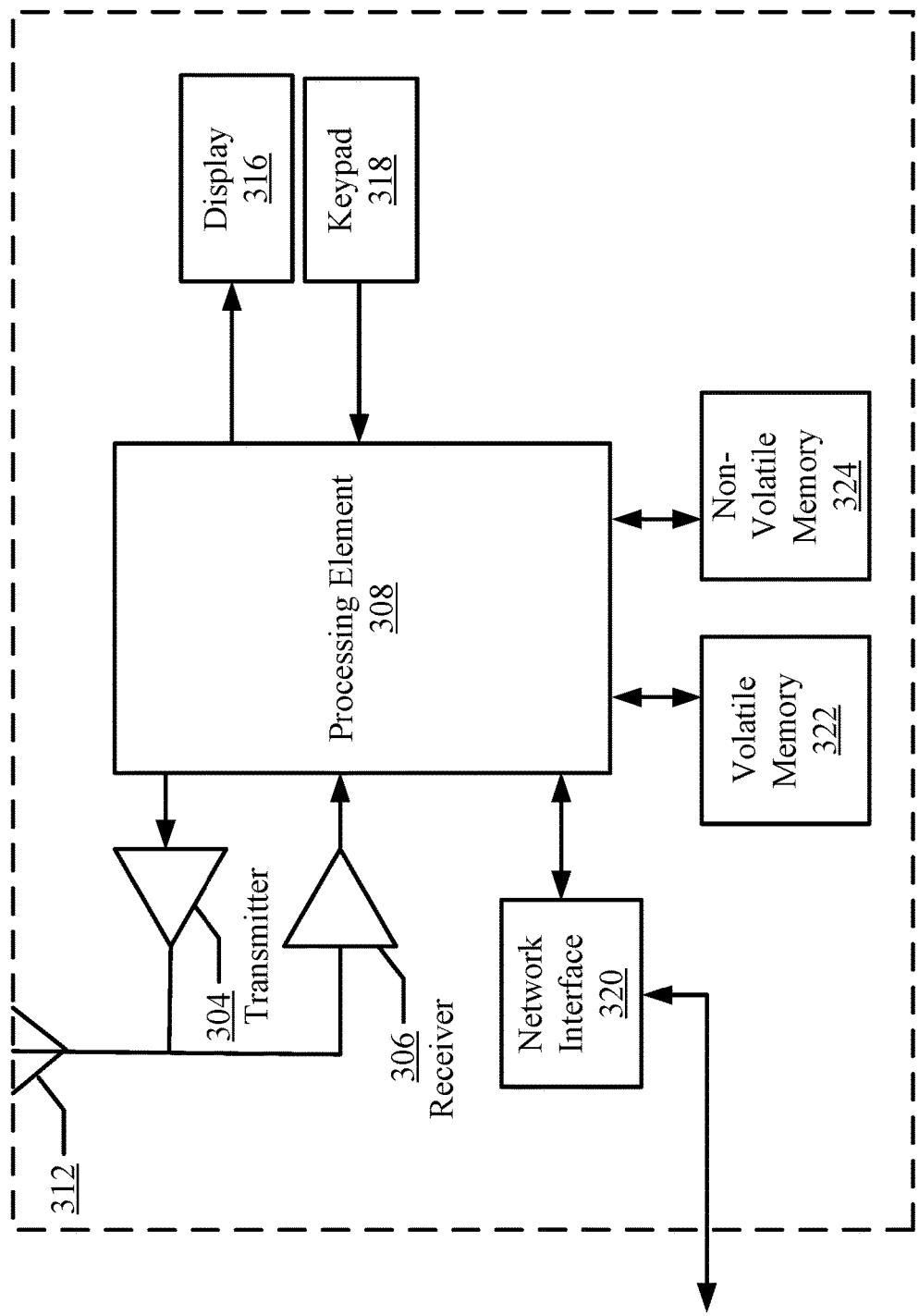
FIG. 3 illustrates an example external computing entity in accordance with some embodiments discussed herein.

FIG. 3 provides an illustrative schematic representative of an external computing entity 102 that may be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 may be operated by various parties. As shown in FIG. 3, the external computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the synthetic data generator computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, 4G, 5G, and/or the like. Similarly, the external computing entity 102 may operate in accordance with multiple wired communication standards and protocols, such as those described above with regard to the synthetic data generator computing entity 106 via a network interface 320.

Via these communication standards and protocols, the external computing entity 102 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 may also download changes, add-ons, and updates, for instance, to its firmware, software (e.g., including executable instructions, applications, program modules), and operating system.

The external computing entity 102 may also comprise a user interface (that may include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the synthetic data generator computing entity 106, as described herein. The user input interface may comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The external computing entity 102 may also include volatile storage or memory 322 and/or non-volatile storage or memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the synthetic data generator computing entity 106 and/or various other computing entities.

In another embodiment, the external computing entity 102 may include one or more components or functionality that are the same or similar to those of synthetic data generator computing entity 106, as described in greater detail above.

As will be recognized, these frameworks and descriptions are provided for exemplary purposes only and are not limiting to the various embodiments.

In various embodiments, the external computing entity 102 may be embodied as an artificial intelligence (AI) computing entity. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Although illustrated as separate entities, the present disclosure contemplates that the components illustrated and described with reference to FIG. 2 may, in some embodiments, be housed in whole or in part in the external computing entity 102. Similarly, the present disclosure contemplates that the components illustrated and described with reference to FIG. 3 may, in some embodiments, be housed in whole or in part in the synthetic data generator system 101, the synthetic data generator computing entity 106, or any other entity not expressly illustrated in FIGS. 1-3. Said differently, the user interface presenting synthetic datasets generated by the operations described hereafter may be presented by the synthetic data generator system 101, the synthetic data generator computing entity 106, the external computing entity 102, or any other entity not expressly illustrated in FIGS. 1-3.

Example Operations for Generating Synthetic Datasets

Figure 4:
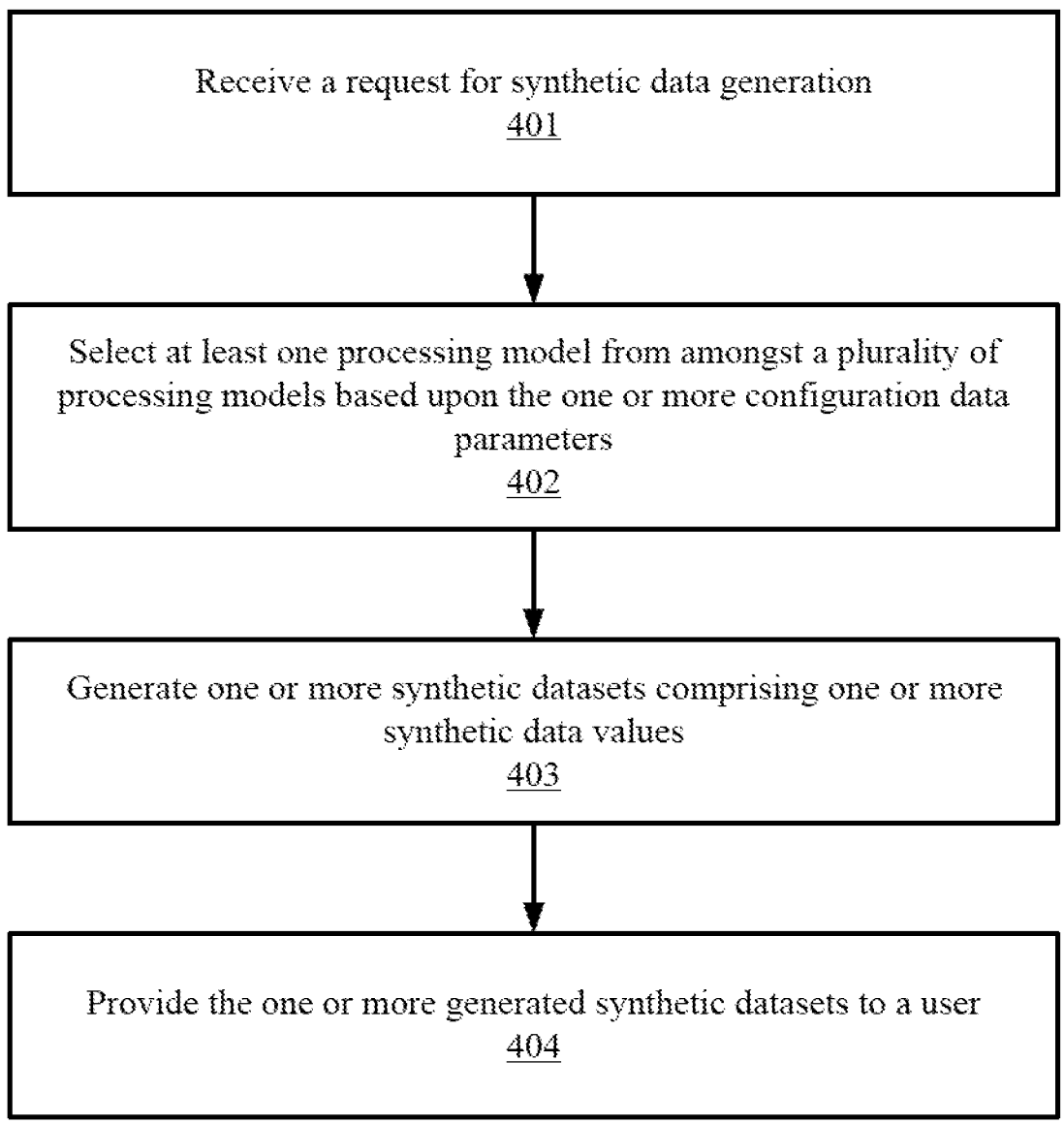
FIG. 4 illustrates an example flowchart for generating one or more synthetic datasets in accordance with some example embodiments described herein.

FIG. 4 illustrates a flowchart containing a series of operations for generating one or more synthetic datasets. The operations illustrated in FIG. 4 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, and/or network interface 220.

As shown in operation 401, the apparatus (e.g., synthetic data generator computing entity 106) includes means, such as processing element 205, volatile memory 215, volatile memory 210, network interface 220, and/or the like, for receiving a request for synthetic data generation. In some example embodiments, the network interface 220 may receive a request for synthetic data generation from one or more external computing entities 102. The request for synthetic data generation may comprise one or more configuration data parameters. In some embodiments, one or more configuration data parameters may, at least in part, set one or more conditions for the generation of one or more synthetic datasets. For example, a configuration data parameter may specify whether one or more base datasets are available, the location of one or more base datasets if available, whether the one or more base datasets comprise PII, an indication of which data categories and/or data values in the one or more base datasets contain PII, an indication whether to remove one or more base data values containing PII, one or more dependency algorithms for one or more data values, one or more data categories, one or more values for the one or more data categories, a requested number of requested data generations, and/or the like. In some embodiments, one or more configuration data parameters may be specified by a user, such as by utilizing a user interface. In some embodiments, the one or more configuration data parameters may be automatically determined by a computing entity. In some embodiments, a computing entity may prompt a user for one or more configuration data parameters. In some embodiments, the synthetic data generator computing entity 106 may store the one or more configuration data parameters in an associated memory, such as storage subsystem 108.

In some embodiments, the synthetic data generator computing entity 106 may generate and provide a prompt for a user to provide one or more configuration data parameters. In some embodiments, the synthetic data generator computing entity 106 may provide the prompt to the user via one or more external computing entities 102, where the prompt may be displayed to the user, such as via display 316. In some embodiments, the synthetic data generator computing entity 106 may provide the prompt to the user via one or more screens and/or display outputs associated with the synthetic data generator computing entity 106.

Thereafter, as shown in operation 402, the apparatus (e.g., synthetic data generator computing entity 106) includes means, such as processing element 205, volatile memory 215, non-volatile memory 210, and/or the like, for selecting at least one processing model from amongst a plurality of processing models based upon the one or more configuration data parameters as received in operation 401. The synthetic data generator computing entity 106 may process the one or more configuration data parameters and determine at least one processing model to select for processing of one or more configuration data parameters. In some embodiments, once at least one processing model is selected from amongst the plurality of processing models, the synthetic data generator computing entity 106 may provide one or more corresponding processing engines configured with circuitry and/or computer program code to execute the one or more selected processing models. For example, the synthetic data generator computing entity 106 may select a rules-based generation model to process one or more configuration data parameters and provide the rules-based generation engine 110 with the one or more configuration data parameters. As described hereafter with reference to FIGS. 5A-5B, the synthetic data generator computing entity 106 may be configured to select at least one processing model based on one or more values of one or more configuration data parameters as described hereafter.

In some embodiments, the one or more processing models may include one or more rules-based generation models, one or more machine learning generation models, one or more noise generation models, and/or one or more obfuscation generation models, which may be stored in an associated memory, such as storage subsystem 108 and/or model definition data store 121. As such, the corresponding processing engine may access the processing model definition as stored in memory, such as the model definition data store 121.

In some embodiments, the synthetic data generator computing entity 106 may select two or more processing models to process the one or more configuration data parameters. As described hereafter with reference to FIG. 11, the synthetic data generator computing entity 106 may be configured to select a first processing model to process a first set of configuration data parameters and a second processing model to process a second set of configuration data parameters as described hereafter. In some embodiments, the first set of data parameters and second set of data parameters may include all, some, or none of the same data parameters. Although described as a first set of data parameters and second set of data parameters, the one or more data parameters may be arranged into any number of sets, partitions, portions, etc. of data parameters.

Thereafter, as shown in operation 403, the apparatus (e.g., synthetic data generator computing entity 106, includes means, such as processing element 205, rules-based generation engine 110, machine learning generation engine 112, noise generation engine 114, and/or obfuscation generation engine 116, and/or the like, for generating one or more synthetic datasets comprising one or more synthetic data values via the selected at least one processing model. In some embodiments, the synthetic data generator computing entity 106 may provide one or more configuration data parameters to the at least one selected processing model. By way of continuing example, the synthetic data generator computing entity 106 may select a rules-based generation model to process one or more configuration data parameters. As such, the synthetic data generator computing entity 106 may provide a rules-based generation engine 110 with the one or more configuration data parameters such that the one or more configuration data parameters may be processed via one or more rules-based generation model(s). Once the synthetic data generator computing entity 106 provides the at least one selected processing model with the one or more configuration data parameters, the at least one selected processing model may generate the one or more synthetic datasets in accordance with one or more model definitions for the at least one selected model. As described hereafter with reference to FIGS. 6-10, the one or more model definitions and operations for various processing models, including a rules-based generation model, machine learning generation model, noise generation model, and obfuscation generation model, are described.

Thereafter, as shown in operation 404, the apparatus (e.g., synthetic data generator computing entity 106) includes means, such as processing element 205, network interface 220, rules-based generation engine 110, machine learning generation engine 112, noise generation engine 114, and/or obfuscation generation engine 116, and/or the like, for providing the one or more generated synthetic datasets to a user. In some embodiments, the one or more configuration data parameters are indicative of one or more output locations for the one or more generated synthetic datasets. For example, the one or more generated synthetic datasets may be output to one or more external computing entities 102 such that they may be displayed to a user, such as via display 316. As another non-limiting example, in some embodiments, the one or more generated synthetic datasets may be output to a display associated with the synthetic data generator computing entity 106. Said differently, providing the generated synthetic datasets to the user at operation 404 may require only an internal transmission by the synthetic data generator computing entity 106.

In some embodiments, the one or more generated synthetic datasets may be stored in an associated memory, such as storage subsystem 108. In some embodiments, the one or more generated synthetic datasets may be stored in a training data store 122 such that the one or more generated synthetic datasets may be utilized for training one or more processing models. The one or more generated synthetic datasets may also be stored with the one or more corresponding configuration data parameters. In this way, synthetic data generator computing entity 106 may utilize the one or more corresponding configuration data parameters when determining whether one or more base datasets with similar configuration data parameters exist for future requests for synthetic data.

Figure 5A:
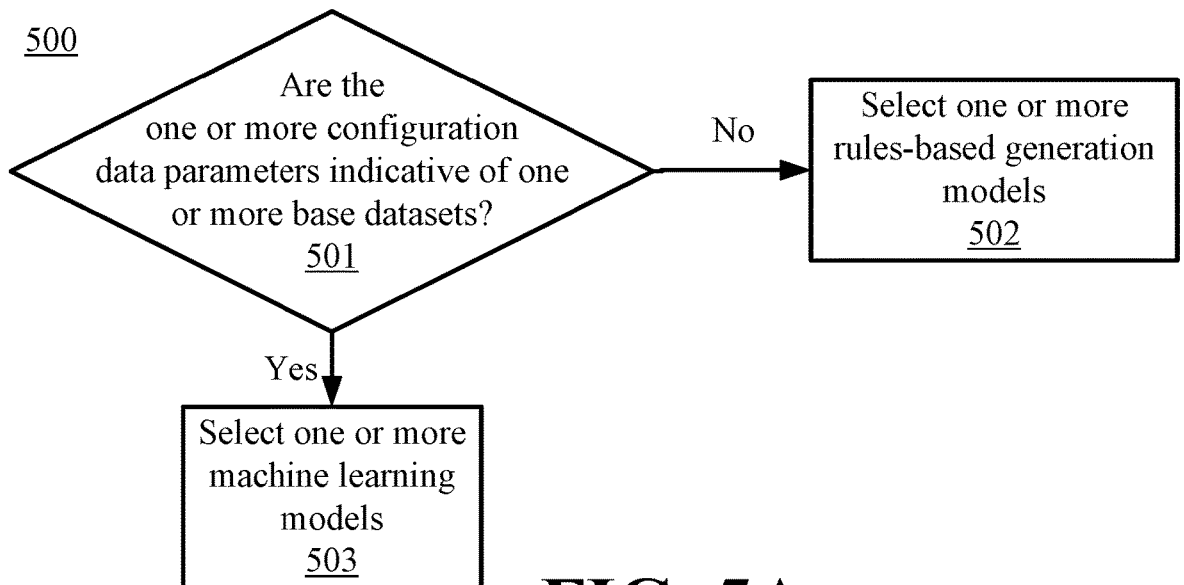
FIGS. 5A-5B illustrate example flowcharts for dynamic processing model selection in accordance with some example embodiments described herein.
Figure 5B:
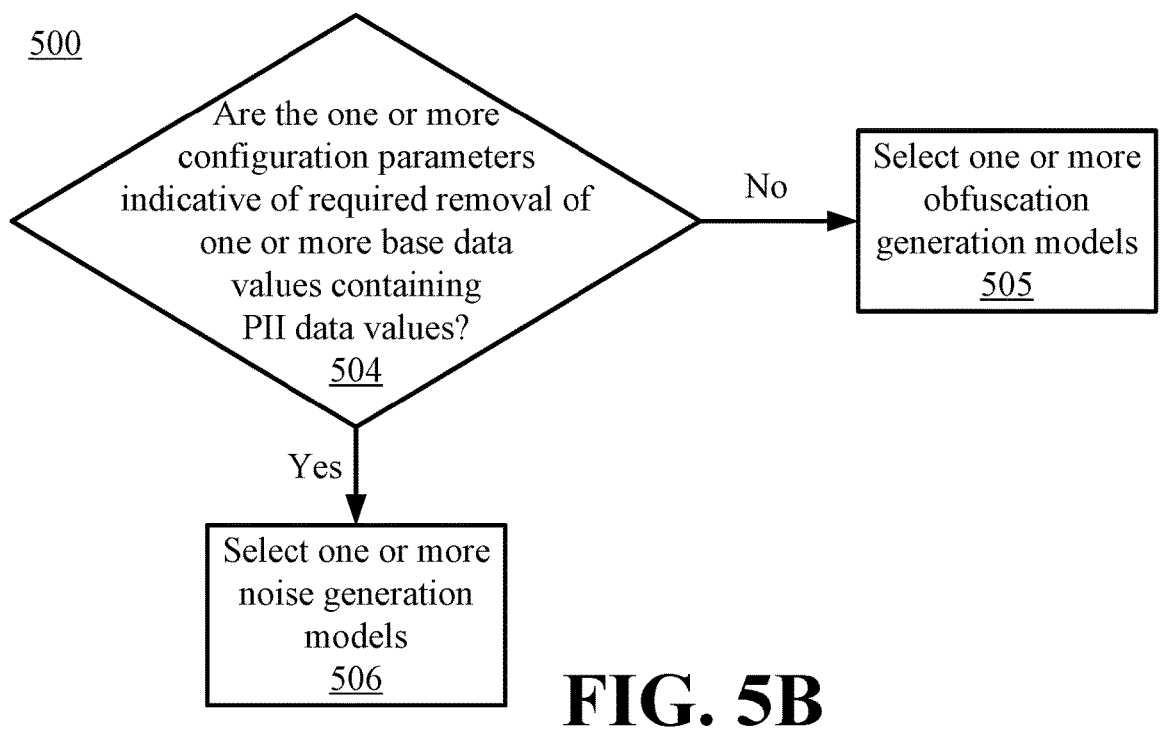

Turning next to FIGS. 5A-B, two flowcharts are shown for selecting at least one processing model from amongst a plurality of processing models based upon one or more configuration data parameters. The operations illustrated in FIG. 5 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, and/or network interface 220.

Referring first to FIG. 5A, as shown in operation 501, the apparatus (e.g., synthetic data generator computing entity 106) includes means, such as processing element 205, volatile memory 215, non-volatile memory 210, or the like, for determining whether the one or more configuration data parameters are indicative of one or more base datasets. As described above with reference to FIG. 4, the synthetic data generator computing entity 106 may receive a request for synthetic data generation that comprises one or more configuration data parameters. In some embodiments, the one or more configuration data parameters may indicate whether one or more base datasets exist which may be used in part to generate the one or more synthetic datasets. In some embodiments, one or more base datasets may be real datasets including data entries or values based on real-world events, individuals, entities, etc. In some embodiments, one or more base datasets may be attached with the request for synthetic data generation. Additionally or alternatively, the location of one or more base datasets may be indicated by one or more configuration data parameters such that the synthetic data generator computing entity 106, machine learning generation engine 112, noise generation engine 114, and/or obfuscation generation engine 116 may access the indicated location to obtain the one or more base datasets. In some embodiments, the synthetic data generator computing entity 106 may prompt the user for an indication of one or more base datasets and/or to confirm one or more base datasets are not available or otherwise desired.

In some embodiments, the synthetic data generator computing entity 106 may prompt the user to determine whether the user would like to query an associated memory for one or more base datasets with similar associated configuration data parameter(s). In response to receiving an affirmative response to the prompt, the synthetic data generator computing entity 106 may query one or more associated memories, such as storage subsystem 108 and/or one or more external computing entities 102. Alternatively, in some embodiments, the synthetic data generator computing entity 106 may automatically query one or more associated memories, such as storage subsystem 108 and/or one or more external computing entities 102. In some embodiments, one or more base datasets may be associated with a set of one or more configuration data parameters, such as the one or more configuration data parameters that are used to generate the one or more base datasets and/or one or more configuration data parameters received with one or more attached and/or referenced base datasets. The one or more base datasets generated and/or received may be stored in an associated memory, such as storage subsystem 108. In some embodiments, the one or more base datasets may be encrypted and stored in an associated memory, such as storage subsystem 108, and may only be decrypted with appropriate access credentials. In some embodiments, the synthetic data generator computing entity 106 may prompt a user for the access credentials if and/or when required to access the one or more encrypted base datasets.

In some embodiments, the synthetic data generator computing entity 106 may select one or more base datasets from the associated memory in an instance in which the synthetic data generator computing entity 106 determines one or more base datasets are associated with one or more configuration data parameters that match one or more configuration data parameters within a threshold amount. In some embodiments. the synthetic data generator computing entity 106 may be configured to select one or more base datasets if the associated one or more configuration data parameters match a threshold count or threshold percentage of the one or more configuration data parameters. For example, the synthetic data generator computing entity 106 may select a base dataset if 60% of its configuration data parameter values match the values of the one or more configuration data parameters for the current request for synthetic data. In some embodiments, the synthetic data generator computing entity 106 may be configured to select one or more base datasets if particular associated configuration data parameters match a threshold count or threshold percentage of particular configuration data parameters. For example, the synthetic data generator computing entity 106 may select a base dataset if 80% of the one or more data category values described by the one or more associated configuration data parameters match the one or more data category values described by the one or more configuration data parameters for the request for synthetic data. In this way, the synthetic data generator computing entity 106 may enact a more targeted approach when selecting one or more base datasets, such as by placing greater value within certain configuration data parameters over others.

In some embodiments, once the synthetic data generator computing entity 106 has selected one or more base datasets, the one or more base datasets may be presented to a user for viewing. As such, the synthetic data generator computing entity 106 may provide the one or more selected base datasets to an associated display of the synthetic data generator computing entity 106 and/or may provide the one or more base datasets to one or more external computing entities 102 such that the one or more base datasets may be displayed on an associated display 316. In some embodiments, the synthetic data generator computing entity 106 may prompt the user to confirm or deny the use of the one or more base datasets. In some embodiments, a user may confirm the use of all, some, or none of the one or more selected base datasets. Once the user response is received, the synthetic data generator computing entity 106 may determine whether to use the one or more selected base datasets in the request for synthetic data generation based upon the user input. In some embodiments, in an instance in which the synthetic data generator computing entity 106 does not select any base datasets, the synthetic data generator computing entity 106 may provide a notification to the user alerting the user of this determination.

In an instance in which the one or more configuration data parameters fails to identify one or more base datasets, the apparatus (e.g., synthetic data generator computing entity 106) may proceed to operation 502. Additionally or alternatively, if no base datasets were selected by a user as described above, the apparatus (e.g., synthetic data generator computing entity 106) may proceed to operation 502. Thereafter, as shown in operation 502 the apparatus (e.g., synthetic data generator computing entity 106) includes means, such as processing element 205, volatile memory 215, non-volatile memory 210, or the like, for selecting one or more rules-based generation models as the at least one processing model. As described hereafter with reference to FIGS. 6-7, the one or more rules-based generation models may be used to generate one or more synthetic datasets. In some embodiments, the synthetic data generator computing entity 106 may select a rules-based generation engine 110 to execute and/or operate the one or more rules-based generation models.

In an instance in which the one or more configuration data parameters fail to identify one or more base datasets, the apparatus (e.g., synthetic data generator computing entity 106) may proceed to operation 503. Additionally or alternatively, if no base datasets were selected by a user as described above, the apparatus (e.g., synthetic data generator computing entity 106) may proceed to operation 503. Thereafter, as shown in operations 503 the apparatus (e.g., synthetic data generator computing entity 106) includes means, such as processing element 205, volatile memory 215, non-volatile memory 210, or the like, for selecting one or more machine learning generation models as the at least one processing model. As described hereafter with reference to FIG. 8, the one or more machine learning generation models may be used to generate one or more synthetic datasets. In some embodiments, the synthetic data generator computing entity 106 may select a machine learning generation engine 112 to execute and/or operate the one or more machine learning generation models.

Referring now to FIG. 5B, as shown in operation 504, the apparatus (e.g., synthetic data generator computing entity 106) includes means, such as processing element 205, volatile memory 215, non-volatile memory 210, or the like, for determining whether the one or more configuration data parameters are indicative of required removal of one or more base values describing PII data values. As described above with reference to FIG. 4, the synthetic data generator computing entity 106 may receive a request for synthetic data generation that comprises one or more configuration data parameters. In some embodiments, the one or more configuration data parameters may indicate whether the one or more base datasets comprise PII, an indication of which data categories and/or data values in the one or more base datasets contain PII, and/or an indication whether to remove one or more base data values containing PII. In some embodiments, if the one or more configuration data parameters indicate that the one or more associated base datasets contain PII data and/or values, the one or more base datasets may be flagged or otherwise denoted as containing PII data. As such, the one or more base datasets may not be stored or may only be stored for a temporary duration. As such, any PII data contained within the base dataset is no longer stored in memory, thus decreasing or removing the risk of exposure of PII data.

In some embodiments, the base dataset may be encrypted and stored in an associated memory and may only be decrypted with appropriate access credentials. In this way, the base dataset may still be stored and accessed while still protecting any contained PII data. In some embodiments, the synthetic data generator computing entity 106 may prompt a user for one or more sets of access credentials that may associate said access credentials with the one or more base datasets such that the one or more provided sets of access credentials may be used to decrypt the encrypted one or more base datasets.

In an instance in which the one or more configuration data parameters fail to indicate required removal of one or more base data values containing PII data values, the apparatus (e.g., synthetic data generator computing entity 106) may proceed to operation 505. In some embodiments, the one or more configuration data parameters may also indicate the one or more base datasets comprise PII data values and an indication of which data categories and/or data values in the one or more base datasets contain PII. Thereafter, as shown in operations 505 the apparatus (e.g., synthetic data generator computing entity 106) includes means, such as processing element 205, volatile memory 215, non-volatile memory 210, or the like, for selecting one or more obfuscation generation models as the at least one processing model. As described hereafter with reference to FIG. the one or more obfuscation generation models may be used to generate one or more synthetic datasets. In some embodiments, the synthetic data generator computing entity 106 may select an obfuscation generation engine 116 to execute and/or operate the one or more obfuscation generation models.

In an instance in which the one or more configuration data parameters are indicative of required removal of one or more base data values containing PII data values, the apparatus (e.g., synthetic data generator computing entity 106) may proceed to operation 506. In some embodiments, the one or more configuration data parameters may also indicate that the one or more base datasets comprise PII data values and an indication of which data categories and/or data values in the one or more base datasets contain PII. Thereafter, as shown in operations 506 the apparatus (e.g., synthetic data generator computing entity 106) includes means, such as processing element 205, volatile memory 215, non-volatile memory 210, or the like, for selecting one or more noise generation models as the at least one processing model. As described hereafter with reference to FIG. 9, the one or more noise generation models may be used to generate one or more synthetic datasets. In some embodiments, the synthetic data generator computing entity 106 may select a noise generation engine 114 to execute and/or operate the one or more noise generation models.

Turning next to FIG. 6, a flowchart is shown for generating one or more synthetic datasets comprising one or more synthetic data values via one or more rules-based generation models. The operations illustrated in FIG. 6 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, network interface 220, and/or rules-based generation engine 110.

As shown in operation 601, the apparatus (e.g., synthetic data generator computing entity 106) includes means, such as processing element 205, volatile memory 215, non-volatile memory 210, rules-based generation engine 110, or the like, for determining one or more data categories, one or more values for the one or more data categories, and a requested number of requested data generations based at least in part on the one or more configuration data parameters via one or more rules-based generation models. As described above with reference to FIG. 4, the synthetic data generator computing entity 106 may receive a request for synthetic data generation that comprises one or more configuration data parameters. In some embodiments, the one or more configuration data parameters may indicate one or more data categories, one or more values for the one or more data categories, and/or a requested number of requested data generations. In some embodiments, one or more rules-based generation models may refer to one or more electronically-stored data constructs that are configured to describe parameters, hyper-parameters, and/or stored operations of models that are configured to process one or more configuration data parameters in order to generate one or more synthetic datasets. In some embodiments, the one or more rules-based generation models are configured with one or more rules specified by one or more mathematical models and/or algorithms. In some embodiments, the one or more algorithms may support various generating various data value distributions including uniform distributions, normal distributions, Poisson distributions, binomial distributions, t-distributions, chi-squared distributions, and the like.

In some embodiments, the one or more configuration data parameters may be indicative of one or more algorithms that may be used at least in part to generate one or more synthetic data values of the synthetic dataset. For example, in some embodiments, the one or more configuration data parameters may be indicative of whether to use uniform random values, a random value between two bounds, random dates between two or more bounds, values that adhere to pre-specified distributions, values dependent upon one or more other values within the same dataset, values dependent upon one or more other values from one or more external datasets (e.g., foreign key relationships), values derived from other values in the same dataset, or the like for the one or more data values generated for each data category of the synthetic dataset. Furthermore, the one or more configuration data parameters may be indicative of a data type for the one or more data categories and/or one or more data values to be generated. For example, the configuration data parameters may be indicative of whether a data value and/or data category is a discrete numerical data value, continuous numerical data value, categorical data value, and/or the like.

In some embodiments, the synthetic data generator computing entity 106 may provide the rules-based generation engine 110 with the one or more configuration data parameters received in the request for synthetic data. Based on the one or more configuration data parameters, the rules-based generation engine 110 may select one or more rules-based generation models for processing the one or more configuration data parameters. In some embodiments, the one or more rules-based generation models may be stored in a storage subsystem 108 and/or in model definition data store 121. In some embodiments, the one or more rules-based generation models may be stored in one or more external computing entities 102. In any case, the rules-based generation engine 110 may retrieve or otherwise access the one or more rules-based generation models from the associated storage entity for processing of the one or more configuration data parameters. In some embodiments, the rules-based generation engine 110 may store or otherwise be associated with one or more rules-based generation models such that the rules-based generation engine 110 does not need to access associated storage entities.

In some embodiments, the one or more configuration data parameters may set one or more conditions for the generation of one or more synthetic datasets. The rules-based generation engine 110 may execute one or more rules-based generation models that may use the provided one or more configuration data parameters without a need for any base dataset. FIG. 12 shows an operational example of one or more configuration data parameters received in a request for synthetic data 1200. Although FIG. 12 is a representation of one or more configuration data parameters in one possible embodiment, it should not be taken as limiting in any way and is purely representative of one possible configuration of the one or more configuration data parameters.

As previously described, in some embodiments, the one or more configuration data parameters may indicate one or more data categories. As shown in FIG. 12, for example, the one or more configuration data parameters may indicate data categories 1201 including the data categories of 'name', 'email', 'generation', 'income', 'income slab', 'state', 'zip code', etc. In some embodiments, the one or more configuration data parameters may indicate one or more data values for the one or more data categories 1202. For example, if the data category is 'gender', the one or more data values associated with the 'gender' data category may indicate the possible values are text values, are associated with a 'simple bucket' logic such that values of the 'gender' data category are defined by one or more determined values, may include the data values of either 'M' or 'F', may have a size of 1 character, and may have a distribution of 60% and 40% corresponding to the 'M' value and 'F' value respectively. As such, another example, if the data category is 'state', the one or more data values associated with the 'state' data category may indicate the possible values are text values, are associated with a 'state' logic such that values of the 'state' data category are defined by one or more determined values, and may have a size of 2 characters. The 'state' logic may be associated with one or more external computing entities 102 and/or storage subsystem 108 containing one or more possible values for the data category 'state'. In some embodiments, the rules-based generation engine 110 contains the one or more possible values for the data category 'state'. For example, one or more external computing entities 102, storage subsystem 108, and/or rules-based generation engine 110 may store a 'state' data category repository which may be store the state abbreviations for the states in the United States or any other location, country, etc. In some embodiments, although not shown in FIG. 12, the one or more configuration data parameters may further include a requested number of requested data generations which may specify the size of the one or more synthetic datasets. For example, the requested number of requested data generations may include a request of fifteen (15) such that a generated synthetic dataset comprises 15 data subsets with each data subset comprising one or more data values for the one or more data categories.

As shown in operation 602, the apparatus (e.g., synthetic data generator computing entity 106) includes means, such as processing element 205, volatile memory 215, non-volatile memory 210, rules-based generation engine 110, or the like, for generating one or more data values for the one or more data categories based on the provided one or more values for the one or more data categories and a requested number of requested data generations as provided from the one or more configuration data parameters. The rules-based generation engine 110 may process the one or more configuration data parameters via one or more selected rules-based generation models to generate one or more data values for the one or more data categories. This may be repeated via the one or more rules-based generation models as many times as indicated by the requested number of requested data generations and the newly generated data may be appended or otherwise included in a compilation of generated synthetic data. As such, the one or more data values for the one or more data categories may serve as the one or more synthetic datasets.

FIG. 13 shows an operational example of one or more one or more generated data values for the one or more data categories 1300. Although FIG. 13 is a representation of one or more generated data values for one or more data categories in one possible embodiment, it should not be taken as limiting in any way and is purely representative of one possible output of one or more generated data values for one or more data categories. The output of one or more possible values for the one or more data categories 1300 may be generated based on the one or more configuration data parameters provided by and described with respect to FIG. 12. By way of continuing example, the one or more data categories 1302 may be 'gender', 'name', 'email', 'age', 'generation', 'income', 'income slab', 'state', and 'zip'. As such, one or more data values 1301 may correspond to the listed one or more data categories 1302. A single data subset 1303 may have associated data values for each of the one or more data categories 1302. The total number of data subsets may correspond to the requested number of requested data generations. For example, the one or more configuration data parameters corresponding to FIG. 12 indicated a requested number of requested data generations value of fifteen (15) and as such, fifteen (15) data subsets, each comprising one or more data values for the one or more data categories, were generated by the rules-based generation engine 110 via one or more rules-based generation models.

Figure 7:
FIG. 7 illustrates an example flowchart for generating one or more synthetic datasets with one or more dependency algorithms via one or more rules-based generation models in accordance with some example embodiments described herein.

Turning next to FIG. 7, a flowchart is shown for generating one or more synthetic datasets wherein one or more configuration data parameters are indicative of one or more dependency algorithms via one or more rules-based generation models. The operations illustrated in FIG. 7 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, network interface 220, and/or rules-based generation engine 110.

As shown in operation 701, the apparatus (e.g., synthetic data generator computing entity 106) includes means, such as processing element 205, volatile memory 215, non-volatile memory 210, rules-based generation engine 110, or the like, for determining whether the one or more configuration data parameters are indicative of one or more dependency algorithms. As described above with reference to FIG. 4, the synthetic data generator computing entity 106 may receive a request for synthetic data generation that comprises one or more configuration data parameters. In some embodiments, the one or more configuration data parameters may indicate one or more dependency algorithms for one or more data categories. In some embodiments, the one or more dependency algorithms are indicative of or otherwise define a relationship between two or more data values from one or more data categories. As such, one or more data values may be dependent upon one or more other data values. The one or more data values may be dependent upon one or more data values within the same data subset and/or upon one or more data values within one or more other subsets. In some embodiments, the one or more data values may be dependent upon one or more data values within one or more base datasets.

Referring again to FIG. 12, which shows an operational example of one or more configuration data parameters received in a request for synthetic data 1200, the one or more configuration data parameters may provide an indication of one or more dependency algorithms for one or more data categories. For example, the data categories 'name', 'email', 'generation', 'income slab', and 'zip' are all dependent data categories. In particular, the data category 'name' is dependent upon the value of the data category 'gender'. As such, the values for the 'name' data category is dependent upon the data value in the 'gender' data category. For example, if the value for the 'gender' data category is 'M', the generated value for the 'name' data category may be generated using a "male name" logic, such as by generating a name based on one or more values in an associated 'male name' repository, for example in storage subsystem 108, rules-based generation engine 110, and/or one or more external computing entities 102. As another example, the value for the 'email' data category is dependent upon the data value in the 'name' data category, which is dependent upon the 'gender' data category. As such, the value for the 'email' data category is dependent upon two or more data values from two or more data categories.

As another example of the one or more configuration data parameters providing an indication of one or more dependency algorithms for one or more data categories, the one or more configuration data parameters may provide an indication of data relationships between individual data subsets within a generated dataset. By way of example, the data category 'gender' indicates a distribution of 60% and 40% corresponding to the "M" value and "F" value, respectively. As such, 60% of the generated data values for the 'gender' data category are 'M' while 40% of the generated values for the 'gender' data category are 'F'. By way of continuing example, if the value for the requested number of requested data generations is fifteen (15), nine (9) of the data subsets will comprise a 'M' value in the 'gender' data category and six (6) of the data subsets will comprise a 'F' value in the 'gender' data category.

As yet another example of the one or more configuration data parameters providing an indication of one or more dependency algorithms for one or more data categories, the one or more configuration data parameters may provide an indication of data relationships between one or more data values and/or data categories and one or more data values and/or categories of one or more base datasets. Although not shown in FIG. 12, one or more data values may depend upon one or more previously-generated synthetic datasets (e.g., base datasets). As such, the rules-based generation engine 110 and/or synthetic data generator computing entity 106 may access the location of the one or more base datasets upon which the one or more data values and/or data categories are dependent and provide at least the one or more data values to rules-based generation engine 110. In an instance in which the one or more base datasets are encrypted and/or contain encrypted data values, rules-based generation engine 110 and/or synthetic data generator computing entity 106 may prompt a user, such as the user who generated the request for synthetic data, for one or more access credentials. If the one or more provided access credentials are valid, the one or more base datasets and/or encrypted data values are decrypted and provided to rules-based generation engine 110. Otherwise, a notification may be provided to the user indicating the one or more access credentials are invalid, requesting the user to provide the one or more access credentials again, and/or requesting the user to change the dependency of the one or more data categories and/or data values such that they are no longer dependent upon the one or more encrypted base dataset categories and/or encrypted base dataset values.

As shown in operation 702, the apparatus (e.g., synthetic data generator computing entity 106) includes means, such as processing element 205, volatile memory 215, non-volatile memory 210, rules-based generation engine 110, or the like, for generating one or more data values associated with the one or more dependency algorithms based at least in part on the relationship described by the one or more dependency algorithms and the value of one or more data values upon which one or more other data values depend. As described above with respect to operation 702, the one or more dependency algorithms may indicate a relationship between two or more data values from one or more data categories. Based on the one or more dependency algorithms, the rules-based generation engine 110 may use one or more rules-based generation models to generate the one or more data values.

Referring again to FIG. 13, one or more one or more generated data values for the one or more data categories 1300 are depicted. By way of continuing example, as described above, the value for the 'name' data category may be dependent upon the value for the 'gender' data category. As such, data subsets with an 'M' data value for the 'name' data category may have a traditional male name value generated for the 'name' data category. Similarly, the value for the 'email' data category may be dependent upon the value for the 'name' data category. In this example embodiment, the value for the email category may include the value for the name category along with a string of numbers and a domain name. As another example, as discussed above, the data category 'gender' may indicate a distribution of 60% and 40% corresponding to the "M" value and "F" value, respectively. As such, 60% of the generated values for the 'gender' data category are male while 40% of the generated values for the 'gender' data category are female. Further, the value for the requested number of requested data generations is fifteen (15), such that fifteen (15) data subsets are generated, nine (9) of which comprise an 'M' value in the 'gender' data category and six (6) of which comprise an 'F' value in the 'gender' data category.

Turning next to FIG. 8, a flowchart is shown for generating one or more synthetic datasets comprising one or more synthetic data values via one or more machine learning generation models. The operations illustrated in FIG. 8 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, network interface 220, and/or machine learning generation engine 112.

As shown in operation 801, the apparatus (e.g., synthetic data generator computing entity 106) includes means, such as processing element 205, volatile memory 215, non-volatile memory 210, machine learning generation engine 112, or the like, for generating one or more generated synthetic datasets comprising one or more generated synthetic data values. In some embodiments, the one or more machine learning generation models are configured to process one or more base datasets and/or one or more configuration data parameters in order to generate one or more synthetic datasets. In some embodiments, the one or more machine learning generation models are machine learning models each comprising a GAN framework. In some embodiments the machine learning generation model may employ one or more NST techniques and/or TVAE techniques. In some embodiments, the one or more machine learning generation models may be machine learning models trained at least in part using one or more base datasets. As described above, in some embodiments, the one or more machine learning generation models may be trained so as to optimize one or more associated hyperparameters. In some embodiments, the parameters and/or hyper-parameters of the one or more machine learning generation models may be represented as values in an n by n dimensional array, such as a matrix. In some embodiments, the number of parameters and/or hyperparameters may be determined based at least in part on the size of the one or more base datasets and/or one or more configuration data parameters.

In some embodiments, the one or more generated synthetic datasets may be generated based at least in part on the one or more base datasets indicated by the one or more configuration data parameters. The one or more base datasets may comprise one or more data categories and one or more data values for the one or more data categories. In some embodiments, one or more base datasets may be associated with a set of one or more configuration data parameters, such as the one or more configuration data parameters that are used to generate the one or more base datasets or the one or more configuration data parameters received with and/or referenced to in the request for synthetic data. In some embodiments, the one or more base datasets may be a real dataset based on real-world events, entities, individuals, etc. In some embodiments, the one or more base datasets may be attached with a request for synthetic data generation. In some embodiments, the location of the one or more base datasets may be indicated by one or more configuration data parameters. The one or more base datasets may then be stored in an associated memory, such as storage subsystem 108.

In some embodiments, the machine learning generation engine 112 may process the one or more base datasets and determine one or more data categories and/or one or more values for the one or more generated synthetic data categories associated with the one or more generated synthetic datasets. In some embodiments, the one or more generated synthetic data categories and/or one or more generated synthetic data values for the one or more generated synthetic data categories may be indicated using one or more configuration data parameters. In any case, the machine learning generation engine 112 may use the one or more data categories and one or more values for the one or more data categories to generate a generated synthetic dataset comprising one or more generated synthetic data values by utilizing one or more machine learning generation models. This may be substantially similar to the process for generating one or more data values as described with respect to FIG. 6.

Referring again to FIG. 13, in one embodiment, the dataset 1300 may be a base dataset comprising real data. In some embodiments, the dataset 1300 may be a previously-generated synthetic dataset. As such, the base dataset may comprise the data categories 1302 and the one or more data values 1301. As such, the one or more machine learning generation models may process the base dataset 1300 and determine the one or more data categories including name', 'gender', 'email', 'age', 'generation', 'income', 'income slab', 'state', and 'zip' and one or more data values based on one or more data values in the base dataset 1300.

As shown in operation 802, the apparatus (e.g., synthetic data generator computing entity 106) includes means, such as processing element 205, volatile memory 215, non-volatile memory 210, machine learning generation engine 112, or the like, for determining whether the one or more generated synthetic datasets satisfies an indication value via the one or more machine learning generation models. In some embodiments, the indication value is a measure of the difference between the one or more generated synthetic datasets and the one or more base datasets indicated by the one or more configuration data parameters. In some embodiments, the value of the indication value is indicative of the closeness or similarity between the one or more generated synthetic datasets and the one or more base datasets. For example, a low indication value may indicate the one or more generated synthetic datasets and the one or more base datasets are indistinguishable (e.g., substantially identical within applicable tolerances) from one another. As another example, a high indication value may indicate the one or more generated synthetic datasets and the one or more base datasets are distinguishable from one another such that the one or more machine learning generation models may discern between the one or more generated synthetic datasets and one or more base datasets.

As shown in operation 803, the apparatus (e.g., synthetic data generator computing entity 106) includes means, such as processing element 205, volatile memory 215, non-volatile memory 210, machine learning generation engine 112, or the like, for, in an instance in which the one or more synthetic datasets fails to satisfy an indication value threshold, modifying the one or more generated synthetic data values by one or more modification values via the one or more machine learning generation models. In some embodiments, the one or more modification values are a configured amount and/or percentage by which to modify the one or more generated synthetic data values. For example, a modification value may be 5% such that all numeric generated synthetic data values are increased by 5%. As another example, a modification value may be −5% such that all numeric generated synthetic data values are decreased by 5%. In some embodiments, the one or more generated synthetic datasets may be associated with one or more modification values such that all numeric generated synthetic data values are modified by the same modification value. In some embodiments, each data category of the one or more generated synthetic datasets may be associated with one or more modification values such that each numeric generated synthetic data value within a data category may be modified by the same modification value. In some embodiments, each generated synthetic data value of the generated synthetic dataset may be associated with one or more modification values such that each numeric generated synthetic data value may be modified by one or more modification values.

In some embodiments, the one or more modification values may be a flag, binary value, or the like indicative of performance of one or more algorithmic operations on the one or more generated synthetic data values. The one or more data algorithms may include but are not limited to data scrambling, data substitution between two or more base data values, and/or the like. For example, if a generated synthetic data value in the generated synthetic dataset corresponds to the value '123-45-6789', the generated synthetic data value may be scrambled such that a synthetic data value of '154-82-3697' is generated.

In some embodiments, if the one or more generated synthetic data values are text values, the one or more modification values may indicate a number or percentage of generated synthetic data values to modify. For example, a modification value may indicate to modify 70% of the one or more generated synthetic data values. If ten (10) synthetic data values are generated, seven (7) of the ten (10) synthetic data values may be modified. In some embodiments, modifying one or more synthetic data values comprises generating a new synthetic data value. In some embodiments, other techniques, such as scrambling, may be used such that the synthetic data value may be modified.

Once the one or more generated synthetic data values have been modified by one or more modification values, operation 802 may be repeated such that the one or more machine learning generation models may determine if the now modified one or more generated synthetic datasets satisfy an indication value. If the generated synthetic dataset satisfies the indication value, the generated synthetic dataset may be output by the one or more machine learning generation models as the one or more synthetic datasets. If the generated synthetic dataset does not satisfy the indication value, the generated synthetic dataset may be further modified by repeating operation 803. The processes described in operations 802 and 803 may be repeated (e.g., iteratively-performed) until the generated synthetic dataset satisfies the indication value. In some embodiments, a limit amount may be placed on the number of iterations of operations 802 and 803. For example, a limit value of ten (10) iterations may be enforced such that after ten (10) iterations of modifying the one or more generated synthetic data values by one or more modification values, no further modification is performed. In such an instance, the machine learning generation engine 112 may provide the synthetic data generator computing entity 106 with an indication that the generated synthetic dataset does not satisfy an indication value. In response, the synthetic data generator computing entity 106 may provide a rules-based generation engine 110, noise generation engine 114, and/or obfuscation generation engine with the one or more configuration data parameters such that one or more rules-based generation models, noise generation models, and/or obfuscation generation models may be used to generate the one or more synthetic datasets. Additionally or alternatively, the machine learning generation engine 112 may automatically provide a rules-based generation engine 110, noise generation engine 114, and/or obfuscation generation engine with the one or more configuration data parameters.

Turning next to FIG. 9, a flowchart is shown for generating one or more synthetic datasets comprising one or more synthetic data values using one or more noise generation models. The operations illustrated in FIG. 9 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, network interface 220, and/or noise generation engine 114.

As shown in operation 901, the apparatus (e.g., synthetic data generator computing entity 106) includes means, such as processing element 205, volatile memory 215, non-volatile memory 210, noise generation engine 114, or the like, for modifying one or more base data values containing PII data by one or more modification values such that one or more modified base data values are generated via one or more noise generation models. In some embodiments, the one or more noise generation models are configured with one or more rules specified by one or more mathematical models and/or algorithms. In some embodiments, the one or more mathematical models and/or algorithms may describe data masking algorithms. In some embodiments, the one or more noise generation models may be configured to remove one or more data values indicated as PII data values. In some embodiments, the one or more configuration data parameters may indicate whether the one or more base datasets comprise PII and provide an indication of which data categories and/or data values in the one or more base datasets contain PII. As such, the one or more noise generation models may determine which PII data values to modify based on the one or more configuration data parameters.

In some embodiments, the one or more noise generation models may be configured to automatically determine one or more data categories and/or data values containing PII data in the one or more base datasets. The one or more noise generation models may be configured to automatically detect common PII data such as social security numbers (SSNs), passport numbers, driver's license numbers, patient identification numbers, financial account numbers, credit card numbers, or the like. In some embodiments, this may be accomplished by comparing the values of the one or more data categories in the one or more base datasets to one or more values of common PII data types. For example, if a base dataset comprises a 'SSN' data category, a noise generation model may determine the data category associated with the value 'SSN' contains PII data. Additionally or alternatively, the one or more noise generation models may be configured to compare one or more data values of the one or more base datasets to one or more common PII data values. For example, if a base data set comprises a 'SSN' data category with a string format of 'XXX-XX-XXXX', a noise generation models may determine that base data values of the 'XXX-XX-XXXX' are PII data values.

Once the one or more noise generation models have identified the one or more base data values describing PII data, the one or more noise generation models may modify each base data value by one or more modification values to generate one or more modified base data values. In some embodiments, the one or more modification values may be a configured threshold and/or modifier function by which to modify the one or more base data values. In some embodiments, the one or more modification values may be indicative of a random threshold by which to modify the one or more base data values and/or a modifier function indicative of one or more mathematical operations. By way of a nonlimiting example, the one or more modification values may include a random threshold value such as +/−5% and a modifier function of 2x+5, where x is the base data value. If a base data value is 100, then the modifier function yields a modifier function value of 250. The random threshold value may then be applied to the modifier function value such that any value between 225 (e.g., −5% if 250) and 275 (e.g., +5% of 250) is chosen.

In some embodiments, the one or more modification values may be a configured value and/or percentage by which to modify the one or more base data values. For example, a modification value may be 5% such that all numeric base data values are increased by 5%. As another example, a modification value may be −5% such that all numeric base data values are decreased by 5%. In some embodiments, the base dataset may be associated with one or more modification values such that all numeric base data values are modified by the same modification value. In some embodiments, each data category of the base dataset may be associated with one or more modification values such that each numeric base data value within a base data category may be modified by the same modification value. In some embodiments, each base data value of the base dataset may be associated with one or more modification values such that each numeric base data value may be modified by a modification value.

In some embodiments, the one or more modification values may be a flag, binary value, or the like indicative of performance one or more algorithmic operations on the one or more base data values containing PII data. The one or more data algorithms may include but are not limited to data scrambling, data substitution between two or more base data values, and/or the like. By way of continued example, if a base data value in the base data category corresponds to the value '123-45-6789', the base data value may be scrambled such that a modified data value of '154-82-3697' is generated.

In some embodiments, if the one or more base data values are text values, the one or more modification values may be a flag, binary value, or the like requiring generation of a new synthetic text value. For example, if an individual's full name is considered PII data, the one or more modification values associated with one or more individuals' names may be a flag a required change to the current base data value. As such, the one or more noise generation models may be configured to generate a synthetic data value for an individual's name for each base data value associated with an individual's name.

As shown in operation 902, the apparatus (e.g., synthetic data generator computing entity 106) includes means, such as processing element 205, volatile memory 215, non-volatile memory 210, noise generation engine 114, or the like, for replacing the one or more base data values describing PII data values with the one or more modified base data values utilizing one or more noise generation models. The one or more noise generation models may replace the one or more base data value describing PII data values with one or more modified base data values not associated with PII data such that one or more modified base datasets no longer contains PII data. In some embodiments, the one or more modified base datasets may be output by the one or more noise generation models as the one or more synthetic datasets.

Optionally, as shown in operation 903, the apparatus (e.g., synthetic data generator computing entity 106) includes means, such as processing element 205, volatile memory 215, non-volatile memory 210, noise generation engine 114, or the like, for modifying the one or more data values other than the one or more base data values describing PII data. In some embodiments, the one or more data values other than the one or more base data values describing PII data may be modified by a modification value. In some embodiments, the one or more further modified base datasets may be output by the one or more noise generation models as the one or more synthetic datasets.

As described above, in some embodiments, the one or more modification values may be a configured threshold and/or modifier function by which to modify the one or more base data values. The one or more modification values may be indicative of a random threshold by which to modify the one or more base data values and/or a modifier function indicative of one or more mathematical operations. For example, the one or more modification values may include a random threshold value such as +/−5% and a modifier function of 2x+5 where x is the base data value. If a base data value is 100, then the modifier function yields a modifier function value of 250. The random threshold value may then be applied to the modifier function value such that any value between 225 (e.g., −5% if 250) and 275 (e.g., +5% of 250) is chosen.

In some embodiments, the one or more modification values may be configured values and/or percentages by which to modify the one or more base data values. For example, a modification value may be 5% such that all numeric base data values are increased by 5%. As another example, a modification value may be −5% such that all numeric base data values are decreased by 5%. In some embodiments, the base dataset may be associated with one or more modification values such that all numeric base data values are modified by the same modification value. In some embodiments, each data category of the base dataset may be associated with one or more modification values such that each numeric base data value within a base data category may be modified by the same modification value. In some embodiments, each base data value of the base dataset may be associated with one or more modification values such that each numeric base data value may be modified by a modification value.

As above, in some embodiments, the one or more modification values may be a flag, binary value, or the like indicative of performance of one or more algorithmic operations on the one or more base data values containing PII data. The one or more data algorithms may include but are not limited to data scrambling, data substitution between two or more base data values, and/or the like. For example, if a base data value in the base data category corresponds to the value '123-45-6789', the base data value may be scrambled such that a modified data value of '154-82-3697' is generated.

In some embodiments, if the one or more base data values are text values, the one or more modification values may be a flag, binary value, or the like requiring generation of a new synthetic text value. For example, if an individual's full name is considered PII data, a modification value associated with one or more individuals' names may be a flag indicating a change in the current base data value. As such, the one or more noise generation models may be configured to generate a synthetic data value for an individual's name for each base data value associated with an individual's name.

Turning next to FIG. 10, a flowchart is shown for generating one or more synthetic datasets comprising one or more synthetic data values using one or more obfuscation generation models. The operations illustrated in FIG. 9 may, for example, be performed by, with the assistance of, and/or under the control of an apparatus (e.g., synthetic data generator computing entity 106), as described above. In this regard, performance of the operations may invoke one or more of processing element 205, volatile memory 215, non-volatile memory 210, network interface 220, and/or obfuscation generation engine 116.

As shown in operation 1001, the apparatus (e.g., synthetic data generator computing entity 106) includes means, such as processing element 205, volatile memory 215, non-volatile memory 210, obfuscation generation engine 116, or the like, for obfuscating one or more base data values describing PII data values from the one or more base datasets utilizing one or more obfuscation generation models. In some embodiments, the one or more obfuscation generation models are configured with one or more rules specified by one or more mathematical models and/or algorithms. In some embodiments, the obfuscation generation model may be configured to obfuscate or otherwise conceal one or more data values indicated as PII data values. In some embodiments, the one or more configuration data parameters may indicate whether the one or more base datasets comprise PII and an indication of which data categories and/or data values in the one or more base datasets contain PII. As such, the one or more noise generation models may determine which PII data values to modify based on the one or more configuration data parameters.

In some embodiments, the one or more obfuscation generation models may be configured to automatically determine one or more data categories and/or data values containing PII data in the one or more base datasets. The one or more obfuscation generation models may be configured to automatically detect common PII data such as social security numbers (SSNs), passport numbers, driver's license numbers, patient identification numbers, financial account numbers, credit card numbers, or the like. In some embodiments, this may be accomplished by comparing the values of the one or more data categories in the one or more base datasets to one or more values of common PII data types. For example, if a base dataset comprises a 'SSN' data category, a obfuscation generation model may determine the data category associated with the value 'SSN' contains PII data. Additionally or alternatively, the one or more obfuscation generation models may be configured to compare one or more data values of the one or more base datasets to one or more common PII data values. For example, if a base dataset comprises a 'SSN' data category with a string format of 'XXX-XX-XXXX', a obfuscation generation models may determine that base data values of the 'XXX-XX-XXXX' are PII data values.

Once the one or more obfuscation generation models have identified the one or more base data values describing PII data, the one or more obfuscation generation models may obfuscate each base data value identified as containing PII data in the one or more base datasets. The one or more obfuscation generation models may obfuscate the one or more base data values containing PII in a variety of ways. This may include but is not limited to encrypting the one or more base data values such that only a user with appropriate access credentials may decrypt the one or more base data values. In some embodiments, the obfuscation generation engine 116 may prompt a user for the access credentials if and/or when they are required to access the one or more encrypted base datasets and/or base data values. As another example, the one or more obfuscation generation models may tokenize the one or more base data values such that the one or more base data values are replaced with "dummy" values. In some embodiments, the one or more base datasets comprising the one or more obfuscated base data values may be output by the one or more obfuscation generation models as the one or more synthetic datasets.

Optionally, as shown in operation 1002, the apparatus (e.g., synthetic data generator computing entity 106) includes means, such as processing element 205, volatile memory 215, non-volatile memory 210, obfuscation generation engine 116, or the like, for modifying the one or more data values other than the one or more base data values describing PII data. In some embodiments, the one or more data values other than the one or more base data values describing PII data may be modified by one or more modification values. In some embodiments, the process to modify the one or more data values other than the one or more base data values describing PII data by one or more modification values is substantially similar to the process described in operation 903. In some embodiments, the one or more base datasets comprising the one or more obfuscated base data values and one or more modified base data values may be output by the one or more obfuscation generation models as the one or more synthetic datasets.

Turning next to FIG. 11, a flowchart is shown for generating one or more synthetic datasets for a first set and second set of configuration data parameters via a first processing model and second processing model. The operations illustrated in FIG. 11 may, for example, be performed by, with the assistance of, and/or under the control of an apparatus (e.g., synthetic data generator computing entity 106, rules-based generation engine 110, machine learning generation engine 112, noise generation engine 144 and/or obfuscation generation engine 116), as described above. In this regard, performance of the operations may invoke one or more of processing element 205, volatile memory 215, non-volatile memory 210, and/or network interface 220.

As shown in operation 1101, the apparatus (e.g., synthetic data generator computing entity 106) includes means, such as processing element 205, volatile memory 215, non-volatile memory 210, or the like, for selecting a first processing model for processing a first set of configuration data parameters. The first set of configuration data parameters may comprise one or more configuration data parameters from amongst the one or more received configuration data parameters. In some embodiments, the first selected model may be a rules-based generation model, a machine learning generation model, a noise generation model, or an obfuscation generation model.

As shown in operation 1102, the apparatus (e.g., synthetic data generator computing entity 106) includes means, such as processing element 205, volatile memory 215, non-volatile memory 210, or the like, for selecting a second processing model for processing a second set of configuration data parameters. The second set of configuration data parameters may comprise one or more configuration data parameters from amongst the one or more received configuration data parameters. The second set of configuration data parameters may comprise the same, a portion of, or none of the same configuration data parameters as the first set of configuration data parameters. In some embodiments, the second selected model may be a rules-based generation model, a machine learning generation model, a noise generation model, or an obfuscation generation model. In some embodiments, the selected first model and the selected second model may be different due to the requirements associated with the respective sets of configuration data parameters.

In some embodiments, the one or more configuration data parameters may be selected based on their applicability to one or more processing models. For example, if the one or more configuration data parameters indicate one or more data categories, one or more data values for the one or more data categories, one or more base datasets are available, the location of one or more base datasets if available, that the one or more base datasets comprise PII, an indication of which data categories and/or data values in the one or more base datasets contain PII, and an indication to remove one or more base data values containing PII, the synthetic data generator computing entity 106 may generate two sets of configuration data parameters. For example, the first set of configuration data parameters may comprise the location of one or more base datasets if available, that the one or more base datasets comprise PII, an indication of which data categories and/or data values in the one or more base datasets contain PII, and an indication to remove one or more base data values containing PII. The second set of configuration data parameters may comprise one or more data categories and one or more data values for the one or more data categories. As such, the synthetic data generator computing entity 106 may select a noise generation model to process the first set of configuration data parameters and a machine learning generation model to process the second set of configuration data parameters. This processing may occur in parallel as described herein.

As shown in operation 1103, the apparatus (e.g., synthetic data generator computing entity 106, rules-based generation engine 110, machine learning generation engine 112, noise generation engine 144 and/or obfuscation generation engine 116) includes means, such as processing element 205, volatile memory 215, non-volatile memory 210, or the like, for generating one or more synthetic datasets for the first set of configuration data parameters via the first selected processing model and generating one or more synthetic datasets for the second set of configuration data parameters via the second selected processing model. The first selected model and second selected model may generate the one or more synthetic datasets using the processes that are substantially similar to those previously described with respect to FIGS. 6-10. Additionally, once the one or more synthetic datasets are generated by the first selected model and second selected model, the one or more datasets may be combined such that a single synthetic dataset is provided to a user. Although two sets of configuration data parameters are described, it should be obvious to one of skill in the art that any number of configuration data parameters may be generated and by extension, any number of processing models may be selected to process the one or more sets of configuration data parameters.

As described above, various technical challenges are surmounted via technical solutions contemplated herein. For instance, example implementations of embodiments of the present disclosure utilize a synthetic data generator system that allows for the generation of synthetic data generated based on one or more base datasets and synthetic data generated based on a set of configuration data parameters via one or more processing models. In operation, embodiments of the present disclosure may receive a request for synthetic data generation comprising one or more configuration data parameters and select at least one processing model from amongst a plurality of processing models to be used to generate the one or more synthetic datasets. Additionally or alternatively, two or more processing models may be selected to process two or more sets of configuration data parameters. As such, the two or more selected processing models may generate one or more synthetic datasets substantially simultaneously. In this way, the plurality of processing models may be leveraged such that the computational complexity of the runtime operations is reduced, thus resulting in a more time efficient and less computationally resource-intensive method to generate one or more synthetic datasets. In this way, the inventors have created a new opportunity for solutions for generating synthetic datasets which were historically unavailable. In doing so, such example implementations confront and solve at least two technical challenges: (1) they provide synthetic data generation in response to dynamic user requests, and (2) they allow for the simultaneous processing of one or more configuration data parameters resulting in a more time efficient and less computationally resource-intensive methods to generate the one or more synthetic datasets.

FIGS. 4-11 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a storage subsystem 108 of the synthetic data generator system 101 and executed by a synthetic data generator computing entity 106 with an associated processing element 205 of the synthetic data generator system 101. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, may be implemented by special purpose hardware-based computer systems which perform the specified functions, or combinations of special purpose hardware with computer instructions.

Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for synthetic data generation, the method comprising:
   receiving a request for synthetic data generation, the request for synthetic data generation comprising one or more configuration data parameters;
   determining a match level, wherein the match level describes a percent match between the one or more configuration data parameters and one or more base datasets;
   selecting a processing model from amongst a plurality of processing models based upon the determined match level, wherein selection of the processing model based on the determined match level comprises selecting a machine learning generation model in an instance in which the match level exceeds a predefined threshold percentage and selecting a rules-based generation model in an instance in which the match level does not exceed the predefined threshold percentage;
   generating one or more synthetic datasets comprising one or more synthetic data values via the selected processing model; and
   providing, to a user via a user interface, the one or more generated synthetic datasets.

2. The method according to claim 1, wherein selecting the processing model from amongst the plurality of processing models further comprises:
   selecting a first processing model for processing a first set of configuration data parameters from amongst the one or more received configuration data parameters; and
   selecting a second processing model for processing a second set of configuration data parameters from amongst the one or more received configuration data parameters,
   wherein generating the one or more synthetic datasets further comprises generating one or more first synthetic datasets for the first set of configuration data parameters via the first selected processing model and generating one or more second synthetic datasets for the second set of configuration data parameters via the second selected processing model.

3. The method according to claim 2, wherein generating the one or more first synthetic datasets and the one or more second synthetic datasets occurs substantially simultaneously.

4. The method according to claim 1, wherein selecting the processing model from amongst the plurality of processing models further comprises:
   in an instance in which the match level does not exceed the predefined threshold percentage, selecting one or more rules-based generation models,
   wherein generating the one or more synthetic datasets further comprises:
      determining, via the one or more rules-based generation models, one or more data categories, one or more values for the one or more data categories, and a requested number of requested data generations based at least in part on the one or more configuration data parameters, and
      generating one or more data values for the one or more data categories based on the provided one or more values for the one or more data categories and the requested number of requested data generations.

5. The method according to claim 4, wherein generating the one or more synthetic datasets further comprises:
   determining, via the one or more rules-based generation models, whether the one or more configuration data parameters are indicative of one or more dependency algorithms, wherein the one or more dependency algorithms are indicative of a relationship between two or more data values from the one or more data categories; and
   generating, via the one or more rules-based generation models, one or more data values associated with the one or more dependency algorithms based at least in part on the relationship defined by the one or more dependency algorithms.

6. The method according to claim 1, wherein providing the one or more generated synthetic datasets further comprises:
   determining, based on the one or more configuration data parameters, one or more output locations for the one or more synthetic datasets; and
   providing the one or more synthetic datasets to the determined one or more output locations.

7. The method according to claim 1, wherein selecting the processing model from amongst the plurality of processing models further comprises:
- in an instance in which the match level exceeds the predefined threshold percentage and the one or more configuration data parameters are indicative of required removal of one or more base data values containing personally identifiable information data values from the one or more base datasets, selecting one or more noise generation models for processing of the one or more configuration data parameters,
- wherein generating the one or more synthetic datasets further comprises:
  - modifying the one or more base data values containing personally identifiable information data value by one or more modification values such that one or more modified base data values are generated via the one or more noise generation models, and
  - replacing the one or more base data values describing personally identifiable information data values with the one or more modified base data values via the one or more noise generation models.

8. The method according to claim 1, wherein selecting the processing model from amongst the plurality of processing models further comprises:
- in an instance in which the match level exceeds the predefined threshold percentage and the one or more configuration data parameters fail to indicate required removal of one or more base data values describing personally identifiable information data values from the one or more base datasets, selecting one or more obfuscation generation models for processing of the one or more configuration data parameters,
- wherein generating the one or more synthetic datasets further comprises obfuscating, via the one or more obfuscation generation models, the one or more base data values describing personally identifiable information data values from the one or more base datasets.

9. An apparatus for synthetic data generation, the apparatus comprising at least one processor and at least one memory including program code, the at least one memory and the program code configured to, with the at least one processor, cause the apparatus to at least:
- receive a request for synthetic data generation, the request for synthetic data generation comprising one or more configuration data parameters;
- determine a match level, wherein the match level describes a percent match between the one or more configuration data parameters and one or more base datasets;
- select a processing model from amongst a plurality of processing models based upon the determined match level, wherein selection of the processing model based on the determined match level comprises selecting a machine learning generation model in an instance in which the match level exceeds a predefined threshold percentage and selecting a rules-based generation model in an instance in which the match level does not exceed the predefined threshold percentage;
- generate one or more synthetic datasets comprising one or more synthetic data values via the selected processing model; and
- provide, to a user via a user interface, the one or more generated synthetic datasets.

10. The apparatus according to claim 9, wherein the apparatus is further configured to, during selection of the processing model from amongst the plurality of processing models:
- select a first processing model for processing a first set of configuration data parameters from amongst the one or more received configuration data parameters; and
- select a second processing model for processing a second set of configuration data parameters from amongst the one or more received configuration data parameters,
- wherein generating the one or more synthetic datasets further comprises generating one or more first synthetic datasets for the first set of configuration data parameters via the first selected processing model and generating one or more second synthetic datasets for the second set of configuration data parameters via the second selected processing model.

11. The apparatus according to claim 10, wherein generating the one or more first synthetic datasets and the one or more second synthetic datasets occurs substantially simultaneously.

12. The apparatus according to claim 9, wherein the apparatus is further configured to select the processing model from amongst the plurality of processing models by:
- in an instance in which the match level does not exceed the predefined threshold percentage, selecting one or more rules-based generation models,
- wherein the apparatus is further configured to generate the one or more synthetic datasets by:
  - determining, via the one or more rules-based generation models, one or more data categories, one or more values for the one or more data categories, and a requested number of requested data generations based at least in part on the one or more configuration data parameters, and
  - generating one or more data values for the one or more data categories based on the provided one or more values for the one or more data categories and the requested number of requested data generations.

13. The apparatus according to claim 12, wherein the apparatus is further configured to generate of the one or more synthetic datasets by:
- determining, via the one or more rules-based generation models, whether the one or more configuration data parameters are indicative of one or more dependency algorithms, wherein the one or more dependency algorithms are indicative of a relationship between two or more data values from the one or more data categories; and
- generating, via the one or more rules-based generation models, one or more data values associated with the one or more dependency algorithms based at least in part on the relationship defined by the one or more dependency algorithms.

14. The apparatus according to claim 9, wherein the apparatus is further configured to provide the one or more generated synthetic datasets by:
- determining, based on the one or more configuration data parameters, one or more output locations for the one or more synthetic datasets.

15. The apparatus according to claim 9, wherein the apparatus is further configured to select the processing model from amongst the plurality of processing models by:
- in an instance in which the match level exceeds the predefined threshold percentage and the one or more configuration data parameters are indicative of required removal of one or more base data values containing personally identifiable information data values from the one or more base datasets, selecting one or more noise generation models for processing of the one or more configuration data parameters, wherein the apparatus is further configured to generate the one or more synthetic datasets by:

modifying the one or more base data values containing personally identifiable information data value by one or more modification values such that one or more modified base data values are generated via the one or more noise generation models, and replacing the one or more base data values describing personally identifiable information data values with the one or more modified base data values via the one or more noise generation models.

16. The apparatus according to claim 9, wherein the apparatus is further configured to select the processing model from amongst the plurality of processing models by:

in an instance in which the match level exceeds the predefined threshold percentage and the one or more configuration data parameters fail to indicate required removal of one or more base data values describing personally identifiable information data values from the one or more base datasets, selecting one or more obfuscation generation models for processing of the one or more configuration data parameters, wherein the apparatus is further configured to, during the generation of the one or more synthetic datasets, obfuscate, via the one or more obfuscation generation models, the one or more base data values describing personally identifiable information data values from the one or more base datasets.

17. A computer program product for synthetic data generation, the computer program product comprising at least one non-transitory computer-readable storage medium having computer-readable program code portions stored therein that, when executed, cause an apparatus to:

receive a request for synthetic data generation, the request for synthetic data generation comprising one or more configuration data parameters;

determine a match level, wherein the match level describes a percent match between the one or more configuration data parameters and one or more base datasets;

select a processing model from amongst a plurality of processing models based upon the determined match level, wherein selection of the processing model based on the determined match level comprises selecting a machine learning generation model in an instance in which the match level exceeds a predefined threshold percentage and selecting a rules-based generation model in an instance in which the match level does not exceed the predefined threshold percentage;

generate one or more synthetic datasets comprising one or more synthetic data values via the selected processing model; and provide, to a user via a user interface, the one or more generated synthetic datasets.

18. The computer program product according to claim 17, wherein the computer-readable program code portions, when executed, further cause the apparatus to select the processing model from amongst the plurality of processing models by causing the apparatus to:

select a first processing model for processing a first set of configuration data parameters from amongst the one or more received configuration data parameters; and select a second processing model for processing a second set of configuration data parameters from amongst the one or more received configuration data parameters, wherein generating the one or more synthetic datasets further comprises generating one or more first synthetic datasets for the first set of configuration data parameters via the first selected processing model and generating one or more second synthetic datasets for the second set of configuration data parameters via the second selected processing model.

19. The computer program product according to claim 17 wherein the computer-readable program code portions, when executed, further cause the apparatus to select the processing model from amongst the plurality of processing models by causing the apparatus to:

in an instance in which the match level does not exceed the predefined threshold percentage, select one or more rules-based generation models, wherein the computer-readable program code portions, when executed, further cause the apparatus to generate the one or more synthetic datasets by causing the apparatus to:

determine, via the one or more rules-based generation models, one or more data categories, one or more values for the one or more data categories, and a requested number of requested data generations based at least in part on the one or more configuration data parameters; and generate one or more data values for the one or more data categories based on the provided one or more values for the one or more data categories and the requested number of requested data generations.

20. The computer program product according to claim 17, wherein the computer-readable program code portions are further configured to, during the providing of the one or more generated synthetic datasets:

determine, based on the one or more configuration data parameters, one or more output locations for the one or more synthetic datasets.

* * * * *